US010933323B2

(12) United States Patent
Anand et al.

(10) Patent No.: US 10,933,323 B2
(45) Date of Patent: Mar. 2, 2021

(54) SYSTEMS AND METHODS TO ENHANCE AND DEVELOP NEW GAMES AND ACTIVITIES BASED ON LOGIC PUZZLES

(71) Applicants: Indu M. Anand, Chelmsford, MA (US); Ishan Anand, Sammamish, WA (US)

(72) Inventors: Indu M. Anand, Chelmsford, MA (US); Ishan Anand, Sammamish, WA (US)

( * ) Notice: Subject to any disclaimer, the term of this patent is extended or adjusted under 35 U.S.C. 154(b) by 148 days.

(21) Appl. No.: 15/985,723

(22) Filed: May 22, 2018

(65) Prior Publication Data
US 2019/0009174 A1    Jan. 10, 2019

Related U.S. Application Data

(63) Continuation-in-part of application No. 15/233,798, filed on Aug. 10, 2016, now abandoned, which is a continuation-in-part of application No. 13/843,844, filed on Mar. 15, 2013, now abandoned.

(60) Provisional application No. 61/794,208, filed on Mar. 15, 2013, provisional application No. 61/799,975, filed on Mar. 15, 2013.

(51) Int. Cl.
| A63F 13/50 | (2014.01) |
| A63F 13/46 | (2014.01) |
| A63F 13/33 | (2014.01) |
| A63F 13/798 | (2014.01) |
| A63F 3/04 | (2006.01) |

(52) U.S. Cl.
CPC .............. *A63F 13/50* (2014.09); *A63F 13/33* (2014.09); *A63F 13/46* (2014.09); *A63F 13/798* (2014.09); *A63F 2003/0418* (2013.01)

(58) Field of Classification Search
CPC .......... A63F 13/50; A63F 13/46; A63F 13/33; A63F 13/798
See application file for complete search history.

(56) References Cited

U.S. PATENT DOCUMENTS

| 4,512,584 A * | 4/1985 | Propsom ............. A63F 3/00574 |
| | | 273/282.1 |
| 2007/0287518 A1* | 12/2007 | Nagel ..................... A63F 3/022 |
| | | 463/9 |

(Continued)

OTHER PUBLICATIONS

U.S. Appl. No. 15/233,798, filed Aug. 10, 2016, Anand et al.

*Primary Examiner* — Kang Hu
*Assistant Examiner* — Thomas H Henry
(74) *Attorney, Agent, or Firm* — Wolf, Greenfield & Sacks, P.C.

(57) ABSTRACT

A class of games and activities of skill and logic, particularly puzzles based on reason and logic are described. Disclosed are a method and a system for comparing solutions to the puzzles based on the paths to solution and for completion of the activities based on the order of carrying out the steps of the activity. A number of applications of the method are disclosed for development of further puzzles and activities from the initial puzzle or activity, as well as for other enriching experiences and expressions, particularly the method of providing a priori or real time hints to a participant to solve the puzzle or advance in the activity. Also disclosed is a particular, novel method for participation by remote audience in logic and skill based activities such as creating or improving known logic puzzles and wagering.

12 Claims, 24 Drawing Sheets

(56) References Cited

U.S. PATENT DOCUMENTS

2008/0004096 A1 1/2008 Graepel et al.
2014/0274244 A1 9/2014 Anand et al.
2017/0036118 A1 2/2017 Anand et al.

* cited by examiner

FIG. 1

| 2 | 5 | 3$_B$ | 4$_B$ | 6$_B$ | 9$_A$ | 8 | 7$_C$ | 1$_A$ |
|---|---|---|---|---|---|---|---|---|
| 7$_B$ | 9$_B$ | 4$_C$ | 3 | 1 | 8 | 6$_B$ | 5$_C$ | 2$_A$ |
| 8$_A$ | 1 | 6 | 5$_B$ | 2 | 7$_B$ | 9 | 3$_C$ | 4 |
| 6 | 3 | 5 | 7$_A$ | 8$_B$ | 2 | 1$_A$ | 4$_A$ | 9 |
| 9$_A$ | 2 | 7$_B$ | 6 | 4$_B$ | 1 | 5$_B$ | 8 | 3$_B$ |
| 4 | 8$_B$ | 1$_A$ | 9 | 5$_C$ | 3$_C$ | 2 | 6 | 7 |
| 3 | 7$_C$ | 8 | 2$_A$ | 9 | 5$_B$ | 4 | 1 | 6$_C$ |
| 5$_A$ | 4$_A$ | 2$_B$ | 1 | 7 | 6 | 3$_A$ | 9$_A$ | 8$_A$ |
| 1$_A$ | 6$_C$ | 9 | 8$_B$ | 3$_C$ | 4$_B$ | 7$_C$ | 2 | 5 |

FIG. 2

|   |   |   |   |   |   |   |   |   |
|---|---|---|---|---|---|---|---|---|
| 8 |   | 4 |   |   | 6 |   |   |   |
|   | 9 |   |   | 8 |   |   |   |   |
| 1 |   | 2 | 3 |   | 4 |   |   |   |
| 6 |   | 8 | 4 |   | 9 | 7 |   | 1 |
|   | 1 |   |   |   |   |   | 9 |   |
| 9 |   | 3 | 5 |   | 7 | 8 |   | 2 |
|   |   |   | 8 |   | 3 | 6 |   | 9 |
|   |   |   |   | 5 |   |   | 3 |   |
|   |   |   | 6 |   |   | 1 |   | 5 |

FIG. 3

| | d | | | | | | | |
|---|---|---|---|---|---|---|---|---|
| 8 | ⁵⁷5_G | 4 | 7_I | 2_B | 6 | 9_I | 1_I | 3_I |
| ᵃ³⁷3_D | 9 | ᵃ⁶⁷7_G | ᵃ¹⁷1_H | 8 | 5_A | 2_J | 4_I | 6_G |
| 1 | 6_F | 2 | 3 | 9_H | 4 | ⁵⁹5_G | 7_H | 8_H |
| 6 | 2_B | 8 | 4 | 3_C | 9 | 7 | 5_C | 1 |
| ᵃ⁵⁷7_C | 1 | ⁵⁷5_B | 2_A | 6_B | 8_A | ᵇ³⁴3_J | 9 | ᵇ³⁴4_J |
| 9 | 4_A | 3 | 5 | 1_A | 7 | 8 | 6_B | 2 |
| 5_H | ᵇ⁵⁷7_H | 1_C | 8 | ᵃ⁴⁷4_I | 3 | 6 | 2_I | 9 |
| ᶜ²⁴2_I | 8_F | 6_G | ᵇ⁷⁹9_I | 5 | 1_B | ⁴⁷4_J | 3 | ⁴⁷7_J |
| 4_G | 3_E | ⁷⁹9_H | 6 | 7_I | 2_A | 1 | 8_G | 5 |

FIG. 4

| 2 | 5 | 3ᴮ | 4ᴮ | 6ᴮ | 9ᴬ | 8 | 7ᶜ | 1ᴬ |
|---|---|---|---|---|---|---|---|---|
| 7ᴮ | 9ᴮ | 4ᶜ | 3 | 1 | 8 | 6ᴮ | 5ᶜ | 2ᴬ |
| 8ᴬ | 1 | 6 | 5ᴮ | 2 | 7ᴮ | 9 | 3ᶜ | 4 |
| 6 | 3 | 5 | 7ᴬ | 8ᴮ | 2 | 1ᴬ | 4ᴬ | 9 |
| 9ᴬ | 2 | 7ᴮ | 6 | 4ᴮ | 1 | 5ᴮ | 8 | 3ᴮ |
| 4 | 8ᴮ | 1ᴬ | 9 | 5ᶜ | 3ᶜ | 2 | 6 | 7 |
| 3 | 7ᶜ | 8 | 2ᴬ | 9 | 5ᴮ | 4 | 1 | 6ᶜ |
| 5ᴬ | 4ᴬ | 2ᴮ | 1 | 7 | 6 | 3ᴬ | 9ᴬ | 8ᴬ |
| 1ᴬ | 6ᶜ | 9 | 8ᴮ | 5ᶜ | 4ᴮ | 7ᶜ | 2 | 5 |

FIG. 9

|   | 5 |   | 8 |   |   | 3 |   |   |
|---|---|---|---|---|---|---|---|---|
|   |   | 8 |   | 9 |   |   |   |   |
|   |   |   |   |   |   |   | 7 |   |
| 9 |   | 4 | 1 | 6 |   |   | 2 |   |
| 2 |   |   |   |   | 4 |   |   | 7 |
|   | 1 |   |   |   |   |   |   | 6 |
|   |   | 3 |   |   | 8 |   | 4 |   |
| 6 |   | 7 |   | 5 |   |   |   | 8 |
|   |   |   | 2 |   |   |   |   |   |

FIG. 14

| | | | | | | | | |
|---|---|---|---|---|---|---|---|---|
| $4_Q$ | 5 | $9_R$ | 8 | $7_D$ | $2_O$ | 3 | $6_G$ | $1_R$ |
| $3_N$ | $7_A$ | 8 | $6_F$ | 9 | $1_N$ | $2_J$ | $5_J$ | $4_O$ |
| $1_Q$ | $6_C$ | $2_P$ | $3_M$ | $4_P$ | $5_K$ | $8_A$ | 7 | $9_R$ |
| 9 | $8_B$ | 4 | 1 | 6 | $7_C$ | $5_B$ | 2 | $3_C$ |
| 2 | $3_C$ | $6_B$ | $5_C$ | $8_C$ | 4 | $9_L$ | $1_L$ | 7 |
| $7_B$ | 1 | $5_A$ | $9_M$ | $2_M$ | $3_N$ | $4_A$ | $8_D$ | 6 |
| $5_D$ | $9_J$ | 3 | $7_E$ | $1_E$ | 8 | $6_F$ | 4 | $2_I$ |
| 6 | $2_J$ | 7 | $4_L$ | 5 | $9_M$ | $1_L$ | $3_M$ | 8 |
| $8_C$ | $4_K$ | $1_C$ | 2 | $3_L$ | $6_F$ | $7_F$ | $9_K$ | $5_I$ |

FIG. 15

|   |   |   |   |   | 1 | 8 | 9 |   |
|---|---|---|---|---|---|---|---|---|
|   |   |   |   | 4 | 9 | 1 |   | 5 |
|   |   |   | 2 |   |   |   | 3 | 6 |
| 2 |   |   |   |   |   |   |   |   |
| 5 |   |   |   | 6 |   |   |   |   |
|   | 6 | 8 | 3 | 2 | 4 |   |   |   |
|   | 5 | 4 |   |   | 6 |   | 3 | 1 |
|   |   | 6 |   | 8 |   |   | 5 |   |
|   |   |   | 4 |   |   |   |   |   |

FIG. 18

| | | | | | | | | |
|---|---|---|---|---|---|---|---|---|
| $4_K$ | $7_K$ | $5_L$ | $6_M$ | $3_D$ | 1 | 8 | 9 | $2_G$ |
| $6_N$ | $3_R$ | $2_R$ | $8_N$ | 4 | 9 | 1 | $7_H$ | 5 |
| $1_N$ | $8_N$ | $9_M$ | 2 | $7_D$ | $5_N$ | 3 | 6 | $4_E$ |
| 2 | $9_N$ | $3_Q$ | $5_M$ | $1_C$ | $7_P$ | $6_K$ | $4_I$ | $8_M$ |
| 5 | $4_J$ | $1_K$ | $9_N$ | 6 | $8_O$ | $7_O$ | $2_H$ | $3_L$ |
| $7_P$ | 6 | 8 | 3 | 2 | 4 | $5_A$ | $1_G$ | $9_P$ |
| $8_A$ | 5 | 4 | $7_E$ | $9_D$ | 6 | $2_A$ | 3 | 1 |
| $9_O$ | $2_S$ | 6 | $1_B$ | 8 | $3_R$ | $4_F$ | 5 | $7_P$ |
| $3_Q$ | $1_O$ | $7_Q$ | 4 | $5_C$ | $2_R$ | $9_P$ | $8_I$ | $6_J$ |

FIG. 19

FIG. 22. Logic Diagram of filling of cells and labelling for solution of figure 11.

FIG.23. Logic diagram of filling of cells and labeling for solution of figure 12.

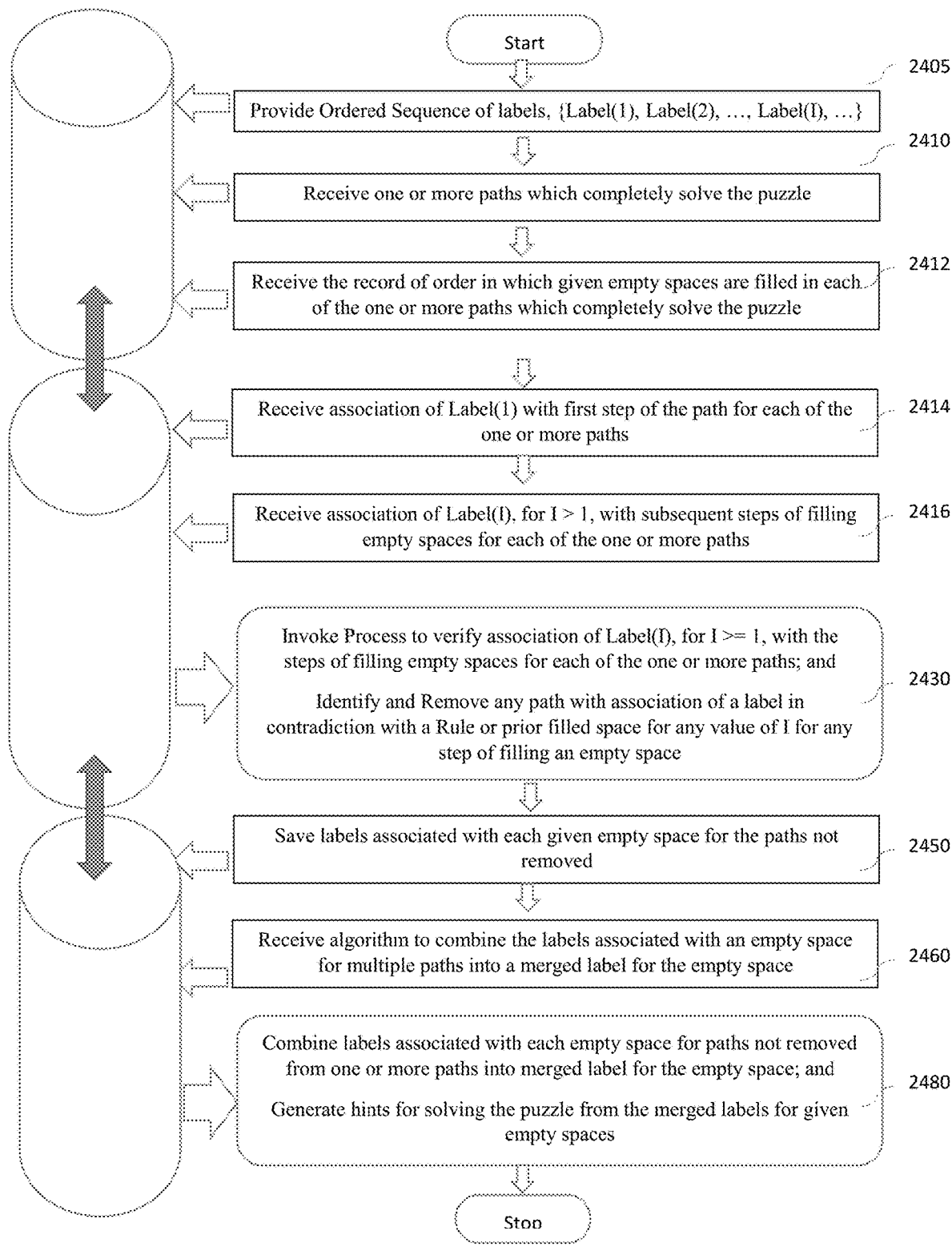
FIG. 24. Basic flow - Hint Generation from Order of Execution of Steps in Many Solution Paths

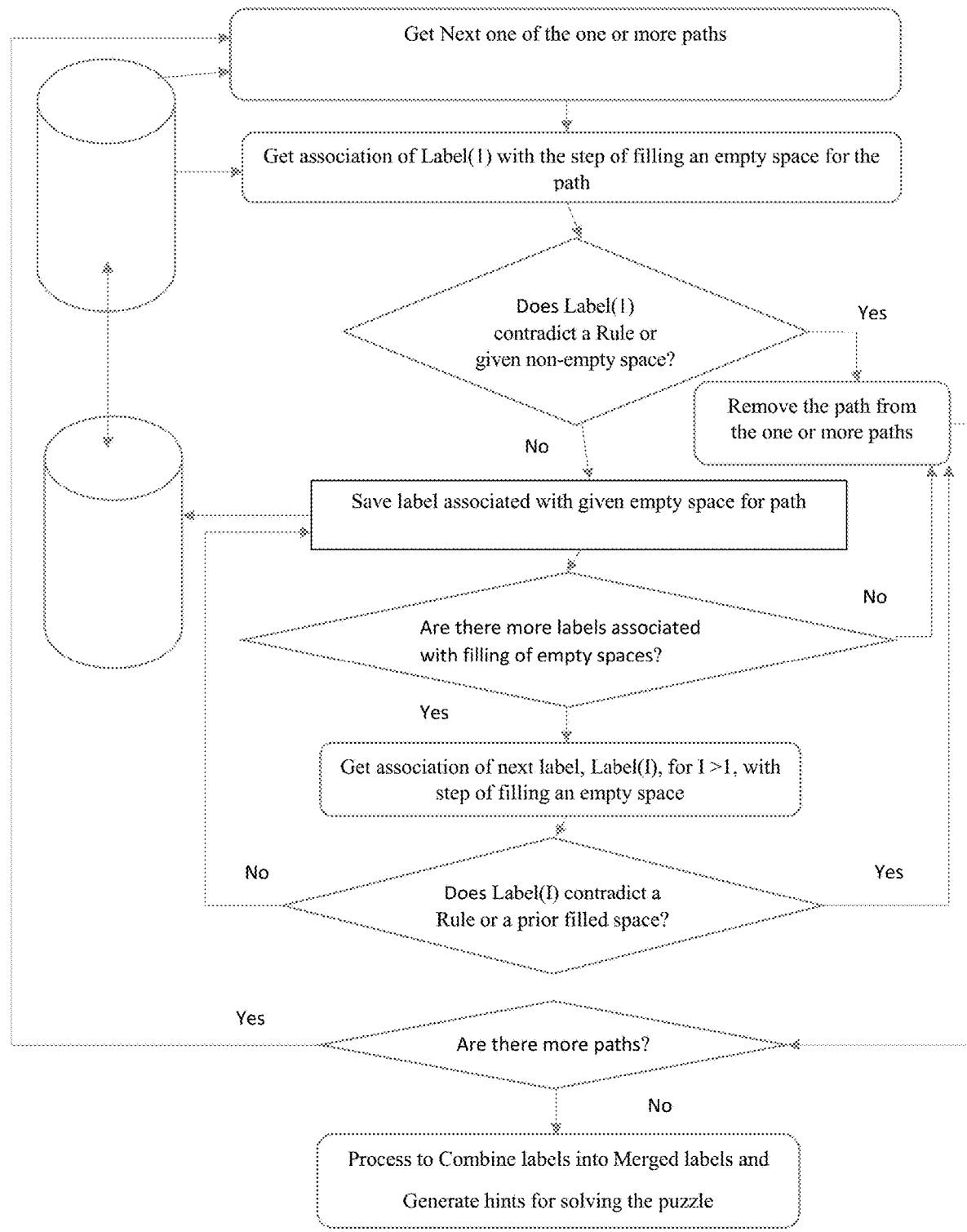
FIG. 25. Verification of Association of Labels with Steps of Solving

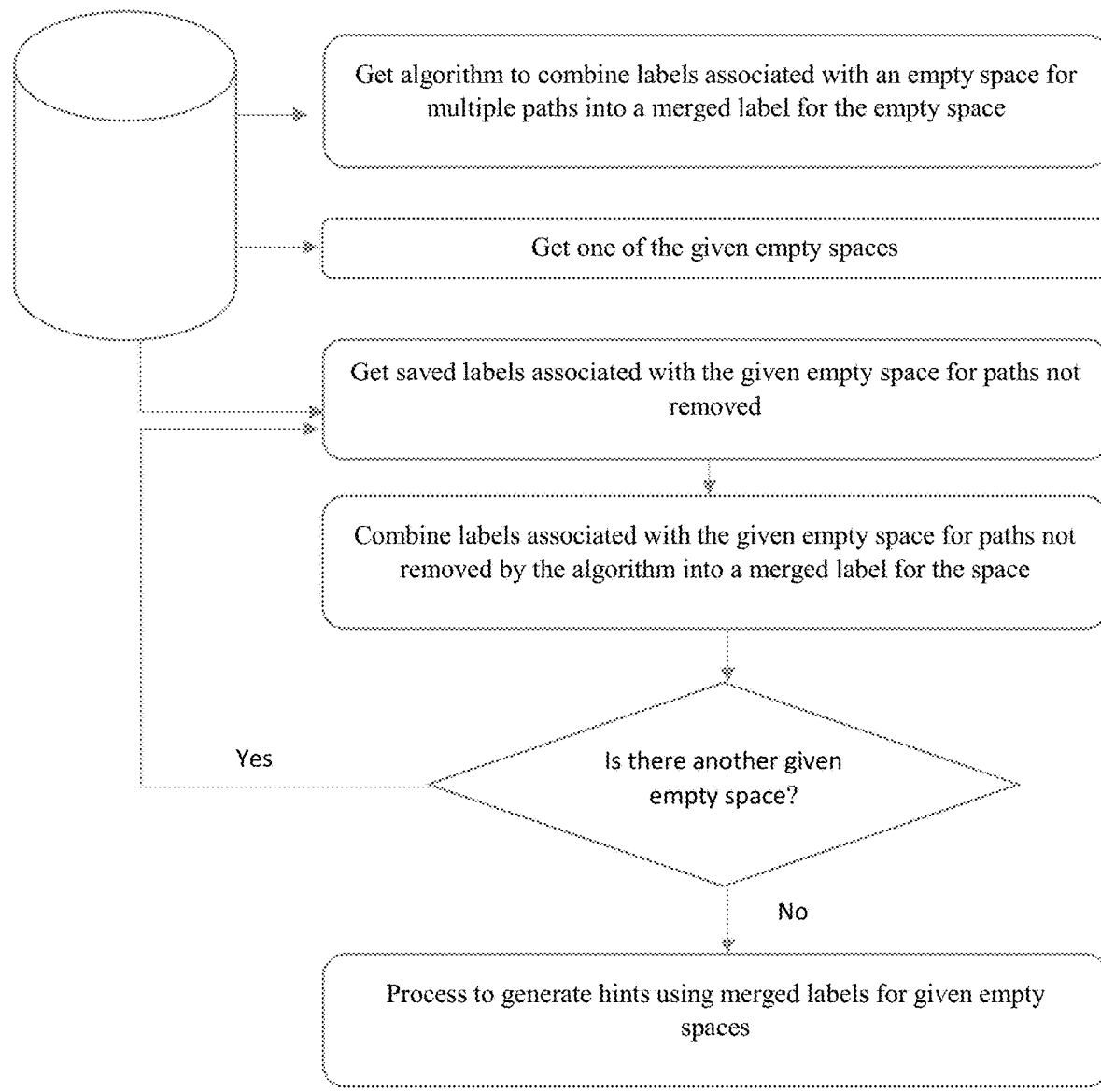
FIG. 26. Process to Combine Labels for Steps of Solving Puzzle for Merged Labels

SYSTEMS AND METHODS TO ENHANCE AND DEVELOP NEW GAMES AND ACTIVITIES BASED ON LOGIC PUZZLES

RELATED APPLICATIONS

This Application is a Continuation-in-part of U.S. application Ser. No. 15/233,798, filed Aug. 10, 2016, entitled "ENHANCING TECHNIQUES AND SYSTEMS FOR LOGICAL GAMES, ACTIVITIES AND PUZZLES", which is a Continuation-in-part of U.S. application Ser. No. 13/843,844, filed Mar. 15, 2013, entitled "ENHANCING TECHNIQUES AND SYSTEMS FOR LOGICAL GAMES, ACTIVITIES AND PUZZLES", now abandoned, which claims the benefit under 35 USC 119(e) of U.S. Application Ser. No. 61/794,208, filed Mar. 15, 2013, entitled "ENHANCING TECHNIQUES AND SYSTEMS FOR LOGICAL GAMES, ACTIVITIES AND PUZZLES," and U.S. Application Ser. No. 61/799,975, filed Mar. 15, 2013, entitled "NOVEL APPLICATIONS OF LOGICAL GAMES, ACTIVITIES AND PUZZLES," the entire contents of each of which is incorporated by reference herein.

FIELD OF THE INVENTION

The present disclosure pertains to the particular field of logic puzzles, and to the games and activities involving skill and logic which can be modeled by logic puzzles a special focus of this application.

BACKGROUND

Logic games, games of skill and strategy, puzzles and similar activities have been used by many cultures for millennia for social and educational purposes, and for entertainment. In addition to puzzles that are of particular interest, many games and activities are in the class envisioned for application of the methods and system disclosed by the present invention, and a reference herein to "activity" subsumes games and puzzles, unless otherwise excluded. Certain variations of physical activities and team sports may also belong in the intended class.

The games and activities in the intended class may be collaborative or competitive, and are characterized by subordinate activities, or "steps", wherein an actor or player may proceed to a "next step" or one of the several possible "next steps," making the decision based on knowledge of the activity, states of the activity up to the moment of taking the step, general knowledge of other players and the milieu, the player's skill and logical "reasonableness" of the next step or steps, and other such factors. The factor of skill and logical reasonableness distinguishes this class of problems from games and activities of pure chance, although the element of chance may be included as an additional decision factor for the intended class of activities.

Games and puzzles involving skill and logic are an intended sub-class. Crossword, word scrambles and numeric puzzles of various types are a category of particular interest. Many such activities are highly popular, and routinely published on pages of newspapers, in books and in other media, including the Internet.

Since 2004, when the British newspaper *The Times*, published a number/logic puzzle called, "Sudoku," this puzzle has become incredibly popular. It is now featured in newspapers and magazines all across the world, along with such staples as crossword and word scramble etc., and has a whole slew of books devoted to it. Variations of Sudoku and other puzzles inspired by it are gaining in popularity as well. The popularity of Sudoku led to the development of television shows based on the idea of getting the contestants to solve the puzzle live. Viewers at home were also encouraged to compete. Although, Sudoku Championship events have been held for several years to determine the best Sudoku players in the world, their popularity and viewership is relatively limited. The method and system disclosed herein may lead to novel ways of participation by television and Internet audiences, potentially enhancing the commercial and educational value of these events.

Sudoku is the best known example of the class of logic puzzles to which the method of this invention would apply. However, the method is applicable to a much wider class of logic puzzles.

Generally in this class of puzzles or problems, the player or players are given a structure containing a number of cells, or spaces; a collection of characters that are often alphanumeric, and asked to fill the cells. Typically one character fills a space or cell according to a set of rules. Some cells may already be filled with the characters by the poser at the start of the puzzle. In the cases where the characters are numerical, the rules may be, but are not necessarily, mathematically based. Similarly, in other cases the filling of cells with characters may have semantic import, but it is not necessarily required by the rules. The words "cell", "square" and "space" are used interchangeably hereinafter, unless otherwise specified.

The Sudoku puzzle, in the most common version of the puzzle, consists of a grid of 81 cells in 9 rows and 9 columns, overlaid with 9 blocks, each block consisting of 9 neighboring cells (squares) arranged in a smaller 3×3 grid. Most of the cells are blank at the outset, but several contain numbers. The goal of the puzzle for this typical case is to fill in the blank squares/spaces or cells with numbers from 1 to 9 so that none of the numbers repeats in any one row or column, or within the 3×3 block containing the cell.

As noted above, Sudoku has given rise to a wide variety of new puzzles. These variations of Sudoku include using different sets of characters, such as letters instead of numbers, using grids of different sizes, or using a different layout for the spaces, such as a 16×16 grid instead of a 9×9 grid, or an irregular grid.

Among the many interesting variations is the implementation of a new set of rules. For example, another popular puzzle "KenKen" requires, like Sudoku, that the numbers in any of the columns and rows do not repeat. However, KenKen has rules that differ from those of Sudoku in important ways. The KenKen grid contains boxes that may be an overlay, irregularly shaped, with neither a fixed length nor a fixed width. Each box, often called a cage, has mathematical operation and a result indicated, with the requirement that the numbers in the cells in a box produce the indicated result by the indicated mathematical operation. A variation that is a kind of progeny of both Sudoku and Kenken, has the usual 81 grid board and requires that no numbers between 1-9 repeat in any row or column. In addition it has an "overlay" of Kenken-like boxes with the requirement that in each such box the numbers produce the result shown by the mathematical operation.

These variations are within the class of puzzles that are amenable to, and contemplated within, the method of this invention. The method as described in detail herein for the typical 81-grid Sudoku or a KenKen puzzle may be adapted for these and such other variations.

Despite the myriad of differences in the details, this class of logic puzzles can be characterized as involving activities with a specified and specific set of characters, spaces, and rules, including the rules for filling in the spaces with one or more members of the set of characters.

The method of this invention may also apply to a class of games and activities, which may be performed step by step and may be analogized by puzzles involving spaces to be filled by characters according to a set of rules.

SUMMARY

The present invention, as presented in this and in the previous related patent applications, discloses methods to distinguish between two or more completed solutions for a class of puzzles where the correctly solved final solution is unique, and to apply the distinctions between the completed solutions to advantage in practical, novel ways.

The present application, unlike the parent and prior applications, contains small but significant new matter and the difference is explained in the next few paragraphs to show the improvements herein over previous incarnations of the invention.

When a logic puzzle has a unique correct solution, as is the case for Sudoku or KenKen, for example, the way to preferentially select one solution over another in the prior art (in a contest, for example) is typically by timing the solutions of two or more participants, then selecting the quickest solution-path as the "winner." But, this race-like method of selecting the winner in a contest ignores other possible inherent distinctions between the paths to solution taken by the contestants.

Our work demonstrates that the order of execution of the steps of solving a puzzle, such as Sudoku or KenKen, can serve as a very useful parameter to distinguish between multiple solution-paths, and the methods disclosed herein, may be used instead of, or in addition to, the traditional time-based criteria for selecting the "winning" solution-path(s).

The approach of this invention has many real world applications. For example, its various embodiments may make possible, inter cilia:

providing hints to a novice player to solve a puzzle without giving away the entire solution;

the possibility of creating puzzles with hints that have specific utility in education;

providing the artists creative new ways to capture and express the structure of a puzzle;

generating, further puzzles and activities from known puzzles; and, providing opportunities for skill-based, on-line wagering games and activities, where rewards may be earned, for entertainment and to engender an interest in numbers and mathematical relationships.

This patent application and its predecessors employ the device of associating labels from a known sequence to track the order of execution of the steps of solving a puzzle, together with methods to "quantify" distinctions in logical order of execution of the steps. Thus, we can capture the inherent logical difference between two or more sequences of executing the solution in a practical, meaningful and time-independent manner, undergirded by a codified version of the following concept: An "over-all shorter sequence" of steps for solving a puzzle is more efficient than a solution-path requiring a longer sequence of steps, where the phrase over-all shorter sequence is defined below in this description.

Unlike its parent and prior applications, the current application adds further, specific answers to the problem of generating hints to solve a puzzle for a new player, based on the data of other completed solutions of the puzzle by tracking the order in which the solution-steps are executed.

The parent of this application, as well as all previous applications, track and use the order of execution of the steps of solution by associating labels with the steps of solution. The previous applications indirectly provided the hints to be based on order of execution of the solution-steps for two or more solution-paths (e.g. "contest winner's" order), but the present application discloses a specific manner of generating the hints, including hints based on a synthesis of the association of labels for all available reasonable solution-paths.

The present approach improves the method by using a synthesis of previous solutions in order to not discard any reasonable solutions offered.

There are several advantages of this current approach for puzzles of practical interest: (i) the labeling and insights of all contest participants are incorporated into the hints; (ii) the hints can stabilize more quickly; (iii) a synthesized, "objective" labeling of the steps assures a kind of built in "smoothing" of the labels from various paths; (iv) hints based on the synthesized, "objective" labeling for the solution steps will be more useful for someone new to solving the puzzle than one based on labels from the "cleverest" path; and (v) this approach is more clearly applicable to the practice scenario envisioned for the invention, viz., where different solutions are provided over networked computing devices, and the labels marking the order of execution of the steps (e.g. filling of the empty spaces) must be generated by a computerized system.

In the embodiments of envisioned practice scenario, a puzzle will be provided on a website for a period of time (days or weeks), inviting complete solutions, along with the record of the order of filling the given empty spaces and other relevant data. It is anticipated that many solution-paths will be offered by multiple participants for each puzzle. At the end of the time period, the system of this invention will process all the solutions offered by the many participants; it will remove any solutions that contain an error or errors, including errors in specifying the order of filling of the empty spaces. Thus it will retain a subset of solutions that do not have logical errors.

The system will then "synthesize" the order of filling of the spaces from all the logically correct solutions, and then use the synthesized order of filling the spaces to generate the hints.

It is expected that often for puzzles of interest the number of empty spaces to be filled will far exceed the number of hints: Because the hints must be differentially displayed to aid a new player (a human) in solving the puzzle, and to avoid overload of the human senses, for example of vision and hearing, a handful of distinctions of colors or sounds etc. should be employed as hints. On the other hand, the number of spaces to be filled in a puzzle of interest will typically have many more than a handful of spaces. It is also important to provide hints which human players can actually use.

Therefore, the computational system has to be programmed to make appropriate decisions to accommodate human psychological boundaries with the complexity of the puzzles.

The disclosure in our previous applications had introduced new logical constructs and structures, including a quantitative measure that may be used for time-independent, logical comparison of two or more completions of an activity based on a puzzle's inherent structure, e.g., the number and types of characters or pieces and their distribution in the puzzle matrix. Thus, for example, to enable regarding a logically reasoned solution for filling out the empty cells of a Sudoku puzzle as more efficient (i.e., preferable) over a "brute-force" trial-and-error approach of trying every number in every empty cell in order to settle on the one number that could be filled into the cell correctly.

In such a case, quantitative construct disclosed was the algorithmically computed "Measure of Efficiency" of a solution or performance that takes into account the number of steps from the start to the finish for a given structure of a game, puzzle or activity. The "efficiency" of the solution in this sense does not depend on time or a "race to the finish line," but correlates to the "complexity" of the puzzle, through tracking mechanisms of the order in which steps of the solution are expected to be executed.

The computation of "Measure of Efficiency" for a puzzle, game or activity of interest to us essentially comprises the following acts: (1) providing an algorithm or mechanism to track a sequence in which the steps of the activity are carried out, typically towards the goal of completing the activity; (2) associating, with each step of the activity a quantity, e.g. a real number, to quantitatively represent the point in the sequence at which the step is carried out; (3) combining the quantities associated with the steps of the sequence into one measure; (4) comparing two or more sequences of steps based on the respective, combined measures so obtained; and (5) preferentially selecting the two or more sequences by the order induced by the comparison of their computed, respective numerical measures.

We recall from the parent application the following:

The present invention represents a novel attempt to address the following twin problems:

(1) How can we distinguish between two or more completions or attempts to complete the activities, games or puzzles where the end or final solution is unique? And, (2) How can we set up rewarding competitive or collaborative activities, games or puzzles where the end or final solution is unique?

In order to address these problems, the present disclosure introduces new logical constructs and structures, including a quantitative measure that may be used for logical comparison of two or more completions of the activity. Such activities can be conducted or shown on television and, increasingly as well, on the Internet to take advantage of their popularity. Also, as mentioned below herein, these activities provide the potential for numerous other advantages to the public in diverse fields from education to cryptography.

For example, while Sudoku is extremely popular, the attempts to hold televised Sudoku competitions have relatively low penetration, despite the backing of supporters such as the BBC and New York Times. Conceivably, this may be attributable in part to a dearth of interesting models for active audience participation or participation via the Internet.

The structures and the basis provided by this invention may be utilized to generate novel games, puzzles and activities as well as interesting models for audience participation, inter alia, via specialized digital devices and/or the Internet for a wide variety of activities. This effort has the potential to spawn whole new branches of industry.

Currently, a Sudoku solving competition is held in real time, often in the presence of live audience. The audience can view the progress of each competitor's solution but the competing players cannot see each other's work in progress. The winner is picked, as for an athletic race, based on the time to arrive at the correct unique solution, Treating the activity thus, like a race against time, is unsatisfactory for many reasons.

This approach does not reward the superiority of the logical reasoning of one competitor's approach over another's for solving the "logical" puzzle, nor does it give the audience any inkling of the logical reasoning employed by the competitors. It misses the opportunity for the audience to appreciate the symphony of "logical artistry" that can be employed in solving Sudoku or a similar logical puzzle.

Time is easy to employ as the determinant for selecting a winner since it is a measurable quantity; at the moment it is the only such determinant in the absence of a quantitative/numerical measure that can capture the logical superiority of one solution over another. The present invention puts forth such a measurable quantity. The method and system disclosed herein can be used to pick the winner of a competition to solve a logic activity or puzzle, such as Sudoku, based on and by a time-independent quantitative measure of logical "superiority." Time, however, may be used as an additional parameter to select the winner if so desired by the organizers of the competition.

We start by observing that a reliable measure of the difficulty level of a puzzle should be based on the puzzle's inherent structure, i.e., the number and types of characters or pieces and their distribution in the puzzle matrix.

Additionally, we may observe that a reasonable way to define the logical superiority of one solution of the puzzle over another solution may be based on a calculation of how readily from a "start" the spaces get filled in a solution. This means that a well-reasoned, more direct solution is more desirable and deserving of winning than a "meandering" one that takes more steps to accomplish the same goal. Thus, for example, a logically reasoned solution for filling out the empty cells of a Sudoku puzzle may be regarded as preferable to a "brute-force" trial-and-error approach of trying every number in every empty cell until it fails in order to settle on the one number that could be filled into the cell.

No prior art in this field offers any quantitative measure that would allow a comparison of participants' proficiency at a logical activity, including Sudoku and other logic games and puzzles, except by comparing their "race to the finish line". But, a race based on "time to finish" is an inadequate measure and an incompetent determinant for the class of activities where the objective may be to pick a winner based in part on their logical reasoning ability.

The "efficiency" of the solution in this sense correlates to the "complexity" of the puzzle. The solution of a less complex puzzle will generally emerge in fewer overall steps, whereas the solution to a more complex puzzle would require a larger number of steps to take shape, a fact that is true for a player at any skill level. In a sense, therefore, the time taken by a human or a computer to solve the puzzle would correlate to the complexity or difficulty level of a puzzle. However, "time to solution" alone cannot capture the complexity or difficulty levels of a logic puzzle, since the variability due to extraneous factors, unrelated to logical argument-cannot be completely controlled regardless of whether a human or a computer is attempting to solve the puzzle.

The present invention, on the other hand, introduces novel algorithmic processes and constructs for generating a quantitative measure for a solution to a puzzle or accomplishment of an activity in the target class, and thereby allows meaningful comparison of performances in a time-independent manner.

The method of this invention can also permit an analysis of the puzzle or activity as to inherent "efficiency" of a solution to the logical problem. The method of this invention provides at least one quantitative estimate of the complexity of a puzzle based on the efficiency of a solution. Such an estimate may be further refined by taking the best estimates from the solutions proffered by several "players" and arriving at an average numerical value that could be considered close to a best estimate.

One of the constructs introduced herein is the algorithmically computed, quantitative "Measure of Efficiency" of a solution or performance that takes into account the number of steps to get from the start to the finish of the game, puzzle or activity, as well as the structure, milieu and performance details at each step etc.

The method of this invention works by considering not only the execution of each step of the activity or the problem, but also the exact sequence of steps in a solution or completion of the activity. Two identical finishes of an activity may be arrived at through two distinct sequences of steps, and yet one sequence may be designated as "preferable" over the other, in part based on the relative efficiency of one sequence of steps over another sequence. The present invention and disclosure rely on the insight that if it is possible to quantify "efficiency" of the exact approach or sequential order of execution of a logic puzzle, game or activity, then it is possible to objectively compare the efficiencies of two or more solutions to the logic puzzle, game or activity.

For a Sudoku-like puzzle, the algorithm, such as the one disclosed herein, to compute the Measure of Efficiency takes into account the total number of cells or spaces in the puzzle, the number of "empty" cells to be filled, as well as the structure of the puzzle, including the set of characters used to fill the spaces and the distribution of the characters given pre-filled in those spaces which are not blank or empty at the start.

Furthermore, such a computation algorithm for the Measure of Efficiency may be adapted for an activity that can be modeled by a logic puzzle.

The disclosed method of computing efficiency of a solution has added utility, since it may conversely be used, to reveal the inherent structure of the puzzle or activity.

The present invention provides a method and system to solve or complete a class of logic, skill or reason based activities, such as puzzles, games or activities. It provides also the ways to compare two or more instances of completion of an activity and rank them in order of preference, which may then be used in turn, collaboratively or competitively, to find the solution to the problem or to complete the activity, and create other puzzles or activities.

Many further applications are contemplated by utilizing the core method presented herein. For example, the method can be used: to determine the efficiency and relative proficiency of two or more players in solving the puzzle; to provide either a priori or dynamic hints in various forms to aid a player in attempting completion of the puzzle or activity; to run internet-based collaboration or competition to solve puzzles or carry out similar logic based activities. Other applications within contemplation are: to provide creative expression of the puzzle solutions; to display the solution or solutions for teaching or entertainment of viewers or spectators, including the viewers or spectators on a computerized network, or audiences of television or live shows; publication of games, activities and puzzles in various forms of media suitable for mass distribution, such as film, video, CD, DVD and other similar media now in existence or available in the future.

Further, the disclosure herein envisions and provides the method for novel, creative expression of the solution or completion of an activity. Some forms of creative expression of an activity or problem may, in turn, serve as springboard to build other puzzles, games or activities, for either collaborative or competitive participation.

A Measure of Efficiency can be computed for a solution or performance to the finish or end of the activity. But, it is also meaningful to compute the measure of efficiency for a segment of a solution or performance i.e. a sequence of steps from one point to another in the activity. Thus it is meaningful to compute the efficiency, e.g., of a row or column or block of Sudoku puzzle.

It is also possible in this context to speak of "optimal" efficiency of solution, which may be defined as an attribute of the puzzle which cannot be surpassed by any path (sequence of steps) leading to the solution to the puzzle/activity. But even when optimal efficiency is either not determined, or determinable, it may be reasonable to speak comparatively of efficiency of one actual (path to) solution over another actual (path to) solution: A solution may be regarded as comparatively more efficient over another if it has a better measure of efficiency.

Considerations similar to Sudoku may apply for other games and activities, including some games of chance, when it is feasible to enumerate all possibilities for a succeeding step from a preceding step—thus excluding those games or activities where there may be an infinite number of steps in a sequence or where there may be an infinite number of possibilities of succession from a step.

For logic puzzles, in particular, typically the possibilities for a succeeding step are finite and the sequences of steps to conclusion are limited. Therefore, the methods disclosed herein may be profitably utilized in many ways: to solve the puzzles and discriminate between different solutions, and in turn, to methodically generate new puzzles, among others.

The suitable, novel constructs and algorithms to find quantitative measure of performing the steps of an activity in a certain order, and achieve several of these goals, are given below in the Detailed Description.

BRIEF DESCRIPTION OF THE DRAWINGS

FIG. 1. is an example of a Sudoku puzzle;

FIG. 2. is an example of a solution of the Sudoku puzzle shown in FIG. 1, using the method in accordance with some embodiments;

FIG. 3. is another example of a Sudoku puzzle;

FIG. 4, is an example of a solution of the Sudoku puzzle shown in FIG. 3, using the method in accordance with some embodiments;

FIG. 9 visually depicts the partial structure of the solution of FIG. 2 where the letters A, B and C correspond to different graphic patterns. This depiction shows the shaded filling cells with labels C. Other cells can similarly be filled with colors, patterns or animation graphics etc.;

FIG. 14 is a Sudoku puzzle;

FIG. 15 is a solution of the puzzle of FIG. 14;

FIG. 18 is another Sudoku puzzle;

FIG. 19 is a solution of the puzzle of FIG. 18;

FIG. 24 is a diagram of basic flow of an embodiment of hint generation from order of execution of steps in multiple solution-paths FIG. 25 is a flow diagram of verification by the system of association of labels with steps of solving a puzzle FIG. 26. is a diagram of the process to combine labels for steps of solving a puzzle into merged labels

DETAILED DESCRIPTION OF INVENTION

The disclosure of the present continuation-in-part application adds to that of its parent application and the prior applications the following matter:

The order of execution of the steps of solving a puzzle can be effectively tracked by associating labels from a given sequence of labels. These labels can then be used to provide quantitative measures of the logical differences between paths to solution of logic puzzles, or between disparate puzzles. They can also be used to provide hints to solve a puzzle, or provide a quantitative method to measure and compare "segments" of puzzle solutions, to educate and to entertain.

For example the game of Sudoku can be used for a skill-based wagering activity on the internet. The labels make it possible to measure for example which rows, columns or 3-by-3 boxes will get filled first, second etc. Or, which number would get filled in all rows, columns or boxes first etc. Or which cells will get filled in which order, and so on.

This activity can be used as a practical step to engender interest in logic.

Similarly, the KenKen puzzle can be used to create interesting educational/mathematical activities for children.

Figure 10:
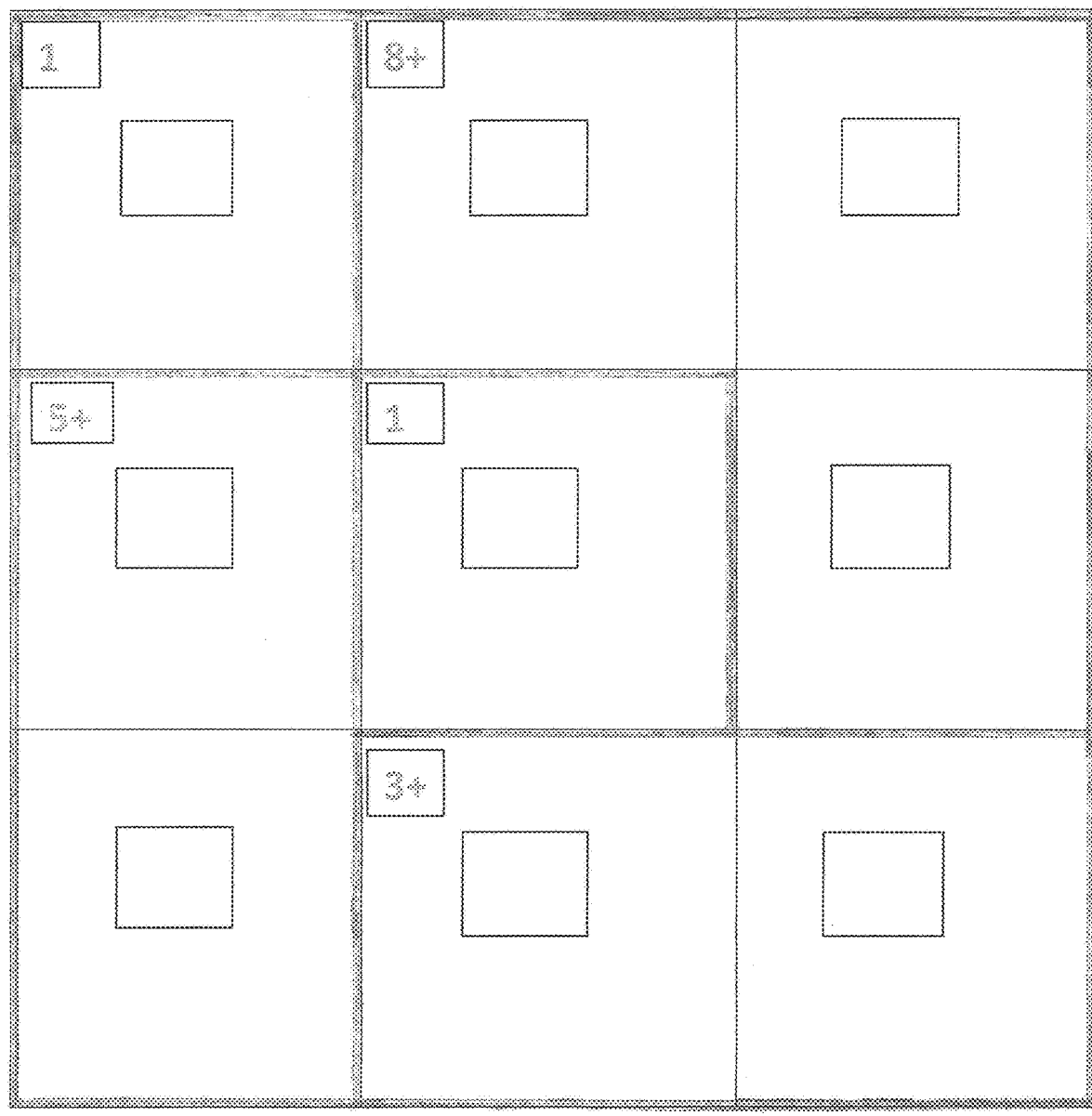
FIG. 10. is an example of a KenKen puzzle.
Figure 11:
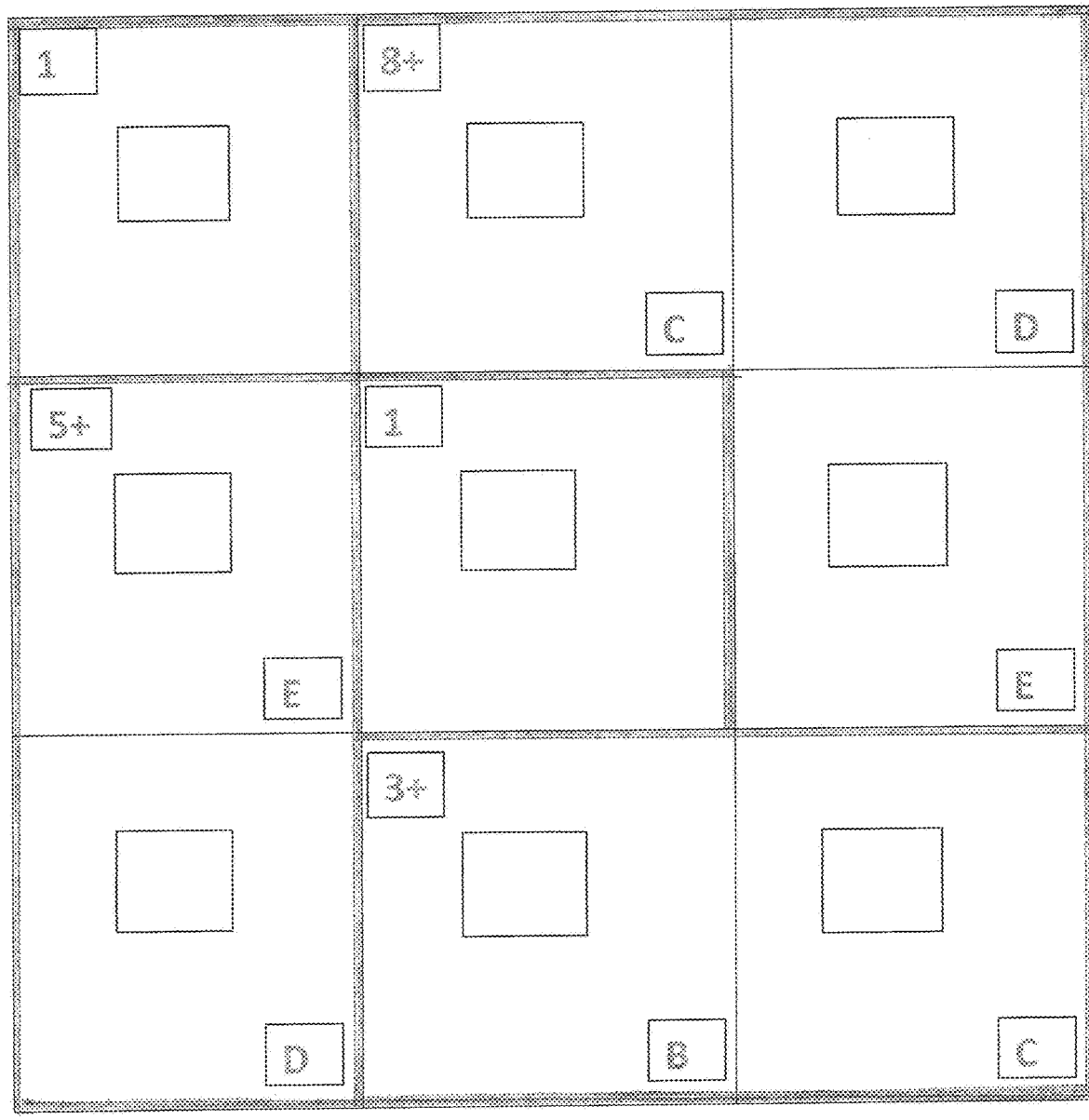
FIG. 11. is a first example of a solution of the KenKen puzzle shown in FIG. 10, with alphabetical letter hints using the method in accordance with some embodiments.
Figure 12:
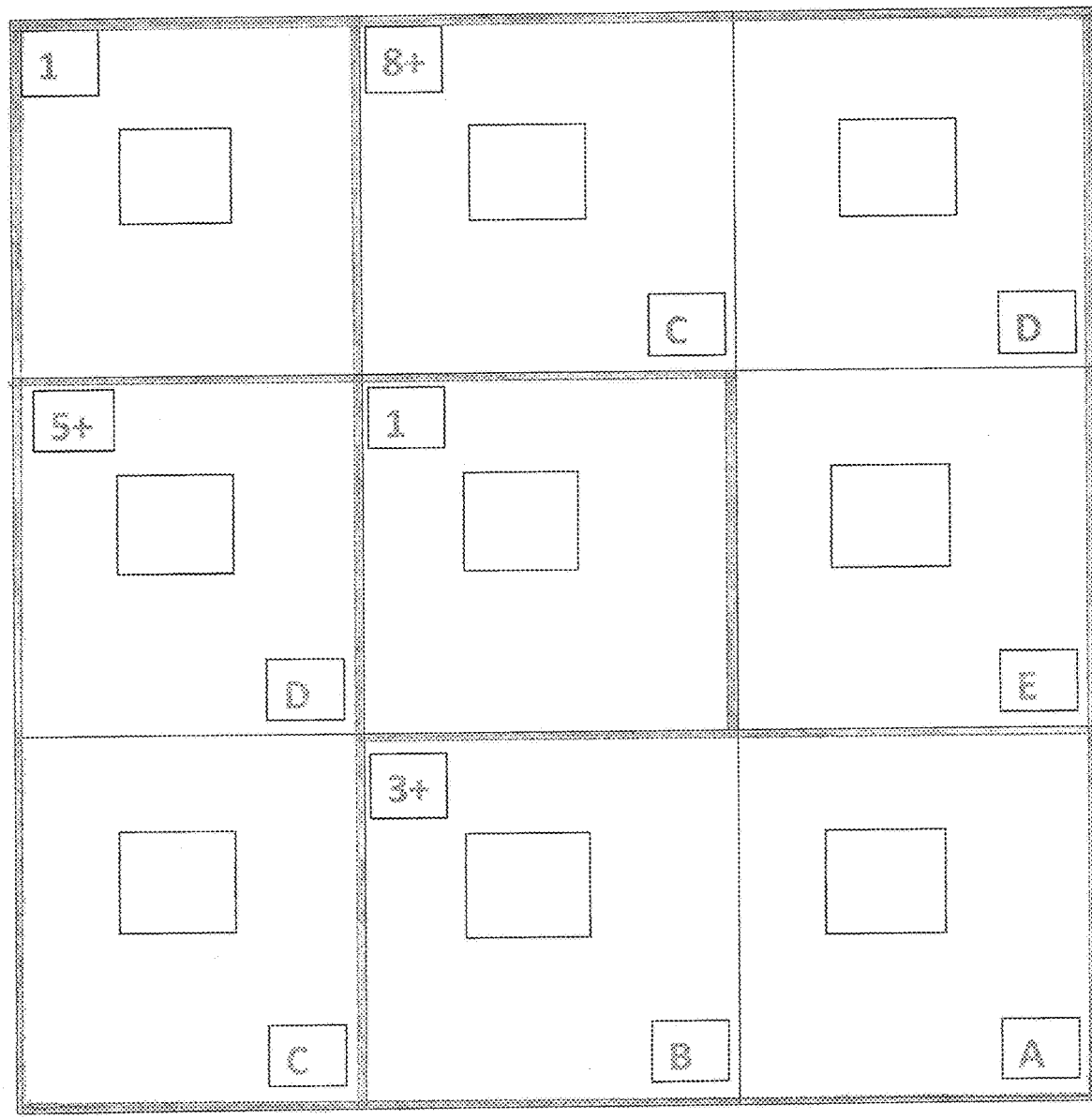
FIG. 12. is a second example of a solution of the KenKen puzzle shown in FIG. 10, with different alphabetical letter hints using the method in accordance with some embodiments.
Figure 13:
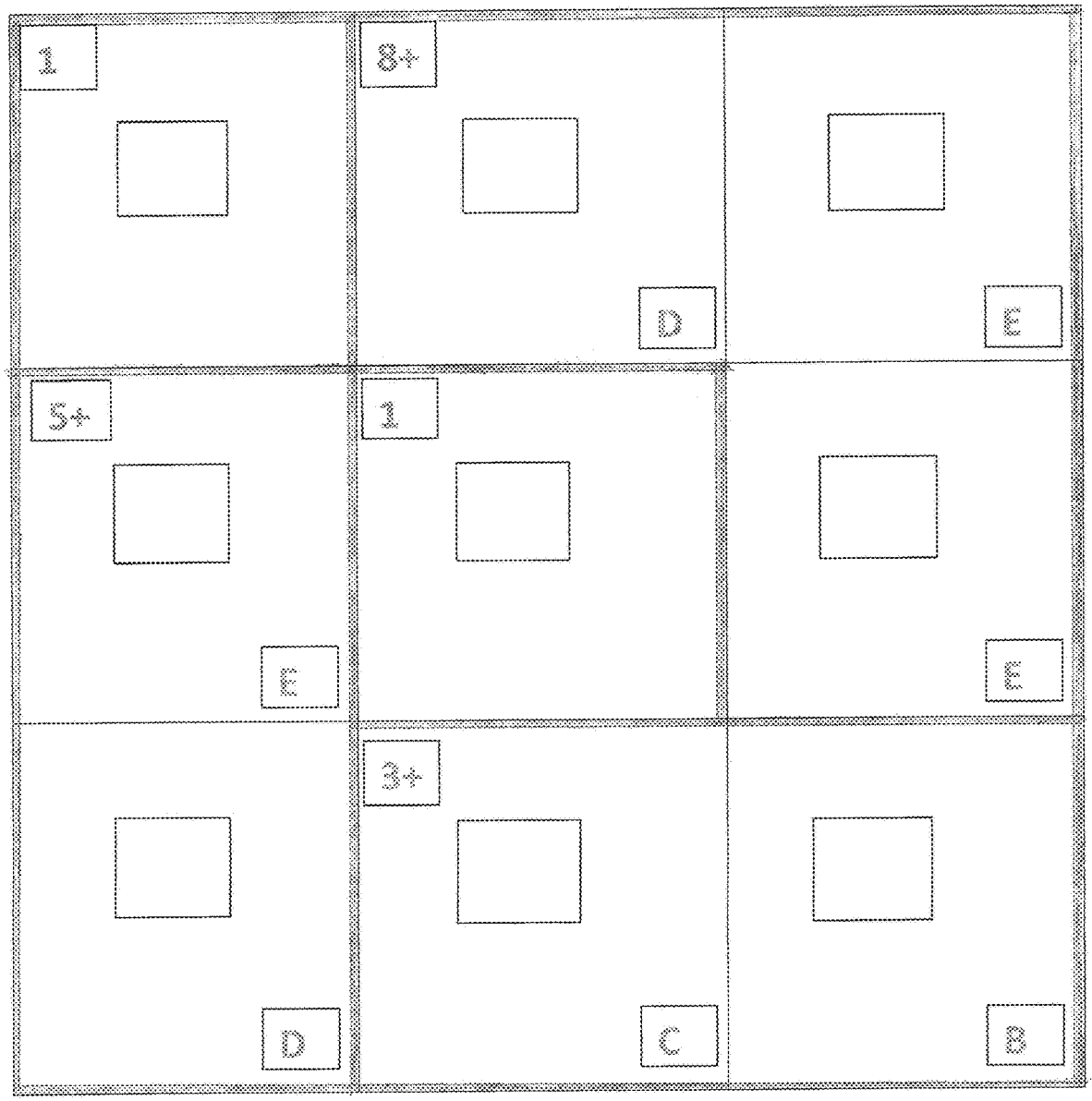
FIG. 13. is a third example of a solution of the KenKen puzzle of FIG. 10, with yet another, different set of alphabetical letter hints using the method in accordance with some embodiments.
Figure 16:
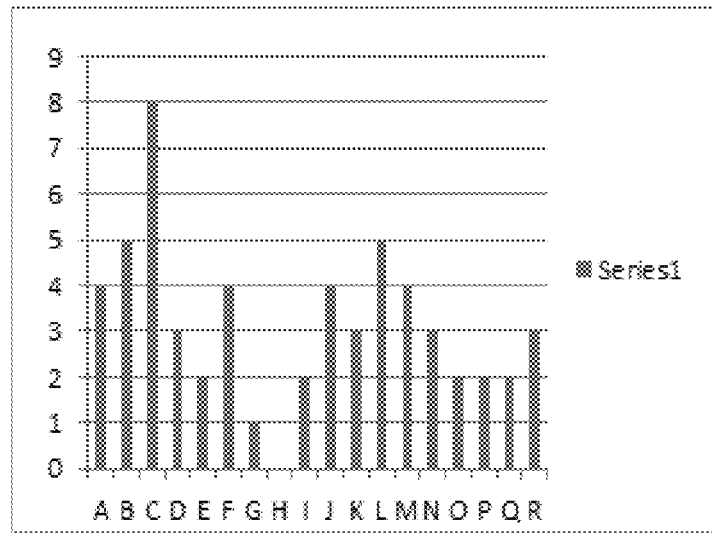
FIG. 16 is a bar chart of the solution of FIG. 15.
Figure 17:
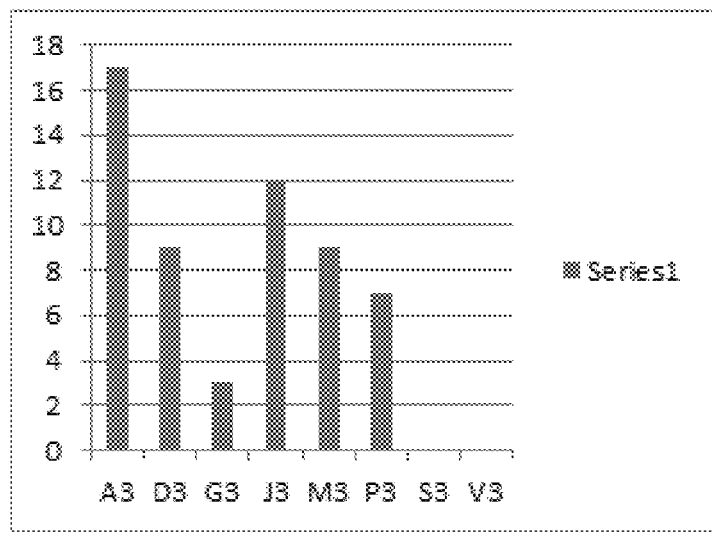
FIG. 17 is a compressed bar chart of the solution of FIG. 15, using an 8-bar standard.
Figure 20:
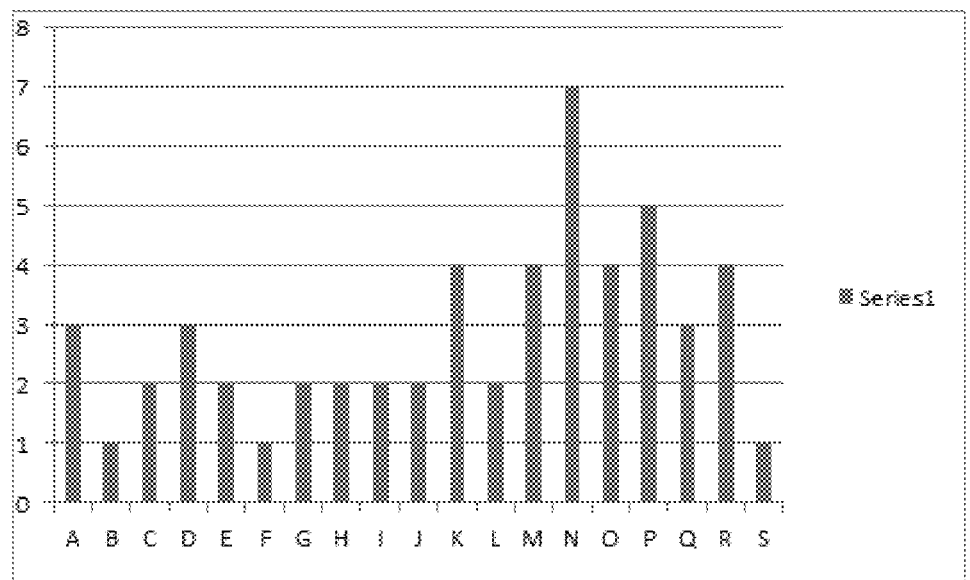
FIG. 20 is the bar chart of the solution of FIG. 19.
Figure 21:
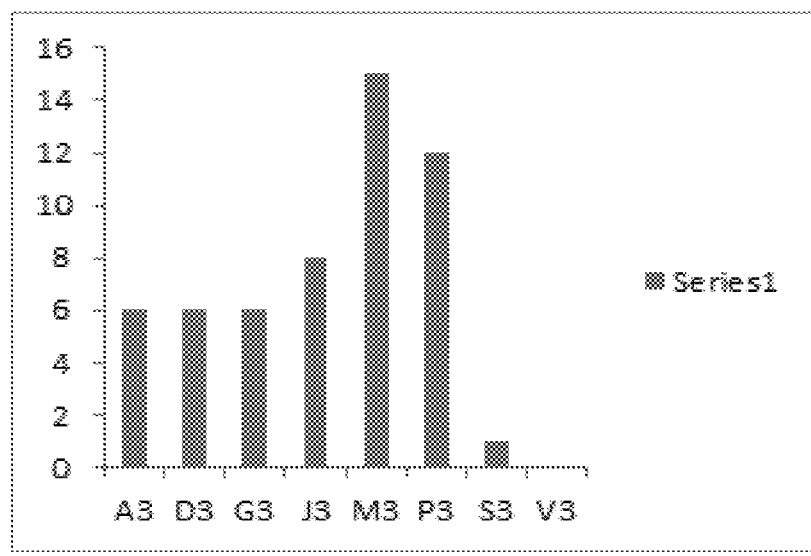
FIG. 21 is the compressed bar chart of the solution of FIG. 19, using an 8-bar standard.

The puzzle depicted by FIG. 10 and its solutions depicted in FIGS. 11, 12 and 13 show how the cells of the puzzle filled in different orders can interest elementary school students in number facts, and their mathematical relationships.

We use the puzzle of FIG. 10 to exemplify new ways of generating hints presented in the current continuation-in-part application.

Instead of selecting one or more prior known solutions to generate the hints to solve the puzzle, a combination of all presented solutions may be generated by the system. For example, FIGS. 11, 12 and 13 have the following labels provided for cells (1,2), (1,3), (2,1), (2,3), (3,1), (3,2) and (3,3) respectively: C/C/D, D/D/E, E/D/E, E/E/E, D/C/D, B/B/C and C/A/B.

It is possible to combine these labels by giving values 1, 2, 3, 4, and 5 to the labels A, B, C, D, and E. By combining the labels for each cell into an average value, for example, we find the values for the same cells to be 2, 2.33333, 3.33333, 3.66666, 4.33333, 4.66666 and 5. There exist other algorithms to combine the values/labels.

It is possible to find new "merged labels" based on these computations. For example, the above average values can be translated to the "nearest" labels as B, B, C, D, D, E and E. For a new player, this gives a good idea which cells to try to tackle first, second and so on.

It is also possible in more complex puzzles (beyond this elementary puzzle) to use more elaborate schemes of combining the labels to generate merged labels. By creating partitions of the combined values computed, it is possible to assign the best number of hints for the target audience. For example, one may want only three hints to be given for the KenKen puzzle of FIG. 10. Then a decision may be made (by human instructor, or a programmed machine) to determine the partitions; for example, the first three average values may correspond to A, the next two values to B and the last two values to C.

Such an approach can be effectively used for complex problems via computer generated synthesized values and labels, which may be more "objectively" determined and stable.

Since the hints would be directed to aid human players, this approach is useful for combining inputs from multiple human players for processing by a computer.

The basic flow of generation of labels and hints for one embodiment is shown in FIG. 24. This flow can be suitably adapted for other algorithms of combining labels.

When a computer is used for generation of labels and hints, it will typically verify that not only are the cells correctly filled with numbers or other characters, but also that the labeling of the filling of cells is correct. The process of such verification is depicted in FIG. 25. The process of producing the merged labels is given in FIG. 26.

Association of "correct" labels has meaning according to the following paragraph or similar to it.

Given a sequence of labels, any cells of the puzzle filled based only on the given rules and any given non-empty (pre-filled) cells are associated with the first label; cells filled based on given rules, pre-filled cells and cells associated with the first label will be associated with the second label, and so on inductively.

Verification by a computer can be carried out to ensure that a cell associated with label "C" (for example) does not require another cell associated with C or "higher" label. If a path or solution segment provided by a player has an incorrectly filled label, then that path will be removed before combining the labels to generate merged labels or hints.

The case of generating labels for the case of filling a cell by trial-and-error can be handled by keeping in mind that trial of different characters to fill the spaces is needed when the character to fill the cell cannot be positively determined easily. If the goal of the puzzle is to fill the spaces efficiently (a reasonable assumption), then the effect of trial and error would be to prolong the process of determination of the character, and result in a more "distant" label from the sequence of labels to be associated with the step of filling the cell.

There may be several meaningful ways to associate labels with a cell which has plural candidate characters for filling it. One process selected in this application is to estimate the prolonging of the determination by considering the trial with characters that fail, i.e., end in a contradiction with a rule, a given pre-filled space or a space that is filled at a prior step of solving the puzzle.

Thus, if there are only two possible characters that can fill a cell, then one of them will lead to a contradiction and other will then correctly be placed in the space. If the contradiction occurs at step X, for example, (assuming numbers are filled into spaces and Roman characters are used for labels), then the correctly filled character will be associated with the label Y (one more than X). This manner of associating labels is compatible with associating the first label with filling of a cell based only on the given rules and given filled cells.

When there are several possible characters to fill a cell or space then the above procedure may be extended by taking the possible characters pairwise and resolving the filling of the cell and associated labels.

Figure 3:
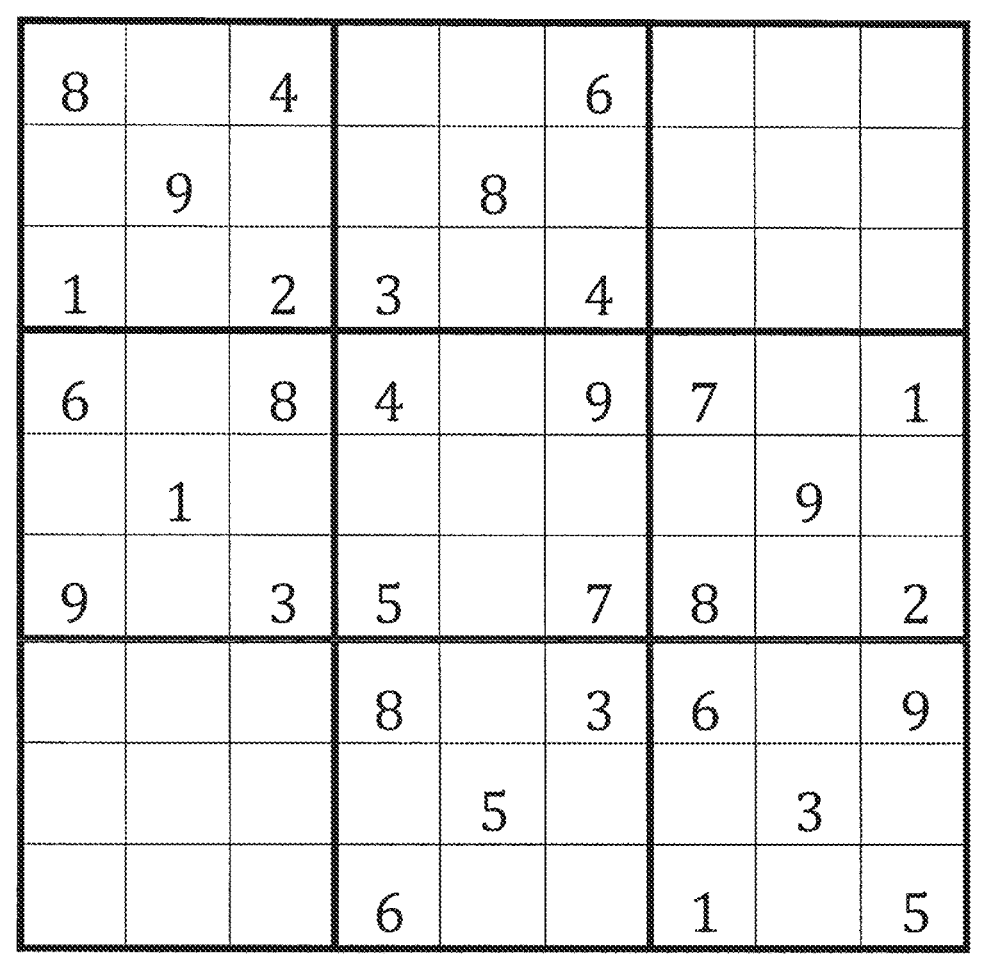

FIGS. 3 and 4 illustrate the process of associating labels for the case where trial-and-error method becomes necessary.

The content of the other figures has been explained in the previously submitted versions of the invention, some of which is reproduced below.

To explain the key ideas constructs and algorithms disclosed by the present invention, we start with a simple example of a logic puzzle known by the name "KenKen;" a puzzle that is rapidly gaining in popularity. Unlike Sudoku, to solve a KenKen puzzle one needs to not only know the numbers but also simple arithmetic operations.

Like Sudoku, KenKen has a grid of cells arranged in rows and columns which are to be filled subject to the rules listed below.

Rule 1: No cell may be filled with a number such that a number is repeated in a row; and Rule 2: No cell may be filled with a number such that a number is repeated in a column.

The "numbers" in Sudoku and KenKen are understood as single digit integers. It is also required for puzzles like Sudoku and KenKen that all the numbers (integers) from 1 to n be used for each row and column of the filled-in grid if the number of rows and columns is n. We may restate this requirement in practical terms as follows:

Rule 3: If for a particular cell in a n by n grid all numbers from the set 1 to n except one can be eliminated by rules 1 or 2, then that cell may be filled with the one number not eliminated.

Together Rules 1, 2 and 3 ensure that to fill the grid we use all the numbers from 1 to n, exactly once, if the number of rows and columns is n. Although it is conceivable to have a puzzle with unequal number of rows or columns, such that the row index i is between 1 and m, and the column index between 1 and n, n≠m, we ignore that possibility for this discussion.

Rules 1, 2 and 3 hold for a number of logic puzzles, including Sudoku and KenKen. Rule 3 states the following important practical perspective on the puzzles of interest: Although the filling of a space or cell is an affirmative act, it is truly an investigative exercise in determining the numbers that may not be used to fill the cell.

Furthermore, the Rules 1, 2 and 3 imply the following duality of filling of the spaces with characters: If all but one character are eliminated for a space, then the only remaining character will be filled into the space; and, if all but one space in a row or column are eliminated for a particular character, then that character will go into the only remaining space.

Unlike Sudoku, however, where the boxes (blocks) typically have equal number of rows and columns, a KenKen box, also known as cage, may be unevenly or irregularly shaped. Also, unlike Sudoku, the filling of the cells with numbers involves arithmetic operations. The cells of a KenKen puzzle may be organized in irregularly shaped cages (boxes) such that the numbers in a cage produce a given result by a given arithmetic operation, both of which are specified for each cage. As consequence of such a layout is that unlike Sudoku, a number in KenKen is allowed to repeat within a cage/box as long as no repetition occurs within a row or a column.

We assume that the puzzles in the class of interest have a unique final solution, that is, the spaces in the correctly filled grid are identical.

However, in general, even though the sequence of steps from the start to finish lead to the same, unique, correctly filled grid, we can distinguish between the "solutions" proffered by players, or multiple attempts by the same player etc. As stated above in the Summary section, the sequences of steps of the solution process carried out in different order may have different desirability depending on their logical conciseness and directness. One straightforward way to distinguish one order of the steps of solving the puzzle from another, for instance, is to prefer a direct and more compact process of solving the puzzle compared to another that may be long and drawn out.

EXAMPLE

A KenKen Puzzle, Effect of Logical Order of Filling a Puzzle's Cells, Quantifying the Effect In order to obtain an intrinsic measure of a solution to a puzzle, game or activity, we compute "Measure of Efficiency" for a path or sequence of steps, which depends on the order in which the steps are executed or spaces or cells in a puzzle are filled. We explain this by an example of an "easy" KenKen puzzle for which we may specify and quantify the difference due to the order of execution of steps.

The key points of the method are exemplified by the puzzle of FIG. 10 and its three solutions presented in FIGS. 11, 12 and 13. The puzzle of FIG. 10 is a KenKen puzzle with some similarities to Sudoku and some important differences.

We show how the order of solving the puzzle may be used to not only distinguish the "solutions" but also to quantify the distinctions by considering in detail a simple KenKen puzzle.

The KenKen puzzle of FIG. 10 is very simple, with a 3×3 grid of cells and 5 cages (i.e. boxes) shown with thick outlines. The only arithmetic operation involved is addition since each cage/box has either a number or a number along with a plus, "±" sign. Any cage that has only a number consists of one cell of the grid and it will be filled with the given number; a cage that carries a number and the plus sign indicates that the numbers filled into the cells within the cage would produce the indicated result as the sum.

Following the usual matrix notation, we may refer to the cells by their positions in the grid, as (1,1), (1,2), (1,3), (2,1), (2,2), (2,3), (3,1), (3,2), and (3,3), wherein (i,j) refers to the cell position in the i-th row and j-th column in the grid. The puzzle is solved when each cell in the grid is filled with a number subject to the rules.

FIG. 10 has 9 cells and the following 5 cages: (1,1); (2,2); (1,2), (1,3) & (2,3); (2,1) & (3,1); and (3,2) & (3,3), It depicts the requirements of a solution that may be described as follows: cell (1,1)=cell (2,2)=1; the sum of (2,1) and (3,1)=5; the sum of (3,2) and (3,3)=3; and the sum of (1,2), (1,3) and (2,3)=8. Given that the numbers in two cells are known from the start, seven cells will need to be filled by a player.

Further, since this puzzle is a 3×3 grid, Rules 1, 2 and 3 imply that each cell will be filled with a number from the set of numbers 1, 2 and 3. In the explanation of the solution below we use the symbol "=" to indicate the number that is filled into a cell.

A First Solution of the Puzzle of FIG. 10, Depicted in FIG. 11

We may proceed to solve this puzzle, reasoning and filling the cells as follows:

Consider first the cage that requires the sum to be 3: It can only result from an addition of a 2 and 1. Therefore, each of the cells (3,2) and (3,3) may be filled with the numbers 1 or 2. Since (2,2)=1, (3,2)≠1 by Rule 2; therefore (3,2)=2, which, in turn implies that (3,3)=1.

Thereafter, there remains only one unfilled cell in the $3^{rd}$ row, i.e., (3,1), that must be filled with the only remaining unused number, i.e., 3 by Rule 3.

Turning next to the first column, where the only remaining unfilled cell is (2,1), which must be filled with the only remaining number, i.e., 2, by Rule 3.

Next we look at the $2^{nd}$ row and the $2^{nd}$ column, with only one empty/unfilled cell remaining in each case, viz. (2,3) and (1,2); and we fill each of these cells with the only remaining number for each, which is 3.

Finally, we fill the last empty cell, with the one number that is still missing in the $1^{st}$ row and $3^{rd}$ column, namely, 2.

Thus, filling of the cells in this solution proceeds in the following sequence: (3,2), (3,3), (3,1), {(2,1), (1,2)}, (2,3), (1,3), wherein the brackets { } signify that the order of filling the cells enclosed by the brackets { } is immaterial.

To solve the puzzle, we relied on the basic rules, Rules 1, 2 and 3 stated above, which ensure that no number is repeated in a row or a column, and all numbers from 1 to 3 are used exactly once in each row or column.

Quantifying the Logical Progress of a Solution

The next step in quantifying the logical order of performing the steps of the activity, game or puzzle is to associate numerical values with those steps. But to quantify the logical order, we must provide a concise logical structure or algorithm for tracking the order of execution of the steps of the activity.

For the puzzle of FIG. 10, a step of the activity is: "Fill an 'empty' cell,"

We may track the order of filling of the cells by associating labels with each step of filling a cell, using as labels the characters in a set with a predefined or "natural" partial order which may meaningfully describe a "sequence" or order of execution of steps. The letters of the Roman alphabet, A, B, C, . . . , or the set of integers 1, 2, 3, . . . , are the readily available character sets for which the "order", "preceding" or "succeeding" character etc. have meaning. Therefore, it would be possible to use these character sets as labels for the steps of the activity. To avoid confusion, however, it may be advisable to use the letters A, B, C, . . . for a puzzle (e.g. Sudoku) where the cells are filled with numbers and to use the set of integers as labels for a puzzle such as word Sudoku where the cells are filled with letters.

It is important to note that a label associated with a step of filling a cell will not be unique. In fact, since filling of a cell will depend on the sequential order in which the cells are filled, we should not expect the labels for the steps of an activity to be unique. What is required of a labeling algorithm is to provide instructions to associate at least one label with a step of filling a cell.

One Algorithm to Set Up Labeling

One algorithm to set up labeling may be as follows:

We start by noting that a partial order may be induced by the letters of the Roman alphabet.

Thus, the letter A is associated with a cell if the number in the cell is determined directly, based only on the basic rules and the numbers given at the start of the puzzle (e.g. in a KenKen's 1-cell cages); the letter B is associated with a cell if its filling is based on the basic rules, information given at the start of the puzzle and at least one cell associated with A but not on any cell associated with the letter "higher" than A, (i.e., the letter that succeeds A in the Roman alphabet). The letter label C is associated with a cell if its filling is based on at least one cell associated with B, but not on any cell associated with the letter C or higher; and so on.

In general, similarly, a letter of the alphabet is associated with the filling of a cell if its filling is based on at least one cell associated with the letter immediately preceding in the alphabet, but no "higher," using the usual order of the letters of the alphabet. Thus, A<B<C< . . . , and a succeeding letter may be regarded as "higher" than the preceding letter(s).

The labels A, B, C, . . . , provide a viable mechanism for precisely tracking a sequential order of filling of the cells in any solution of the puzzle, provided that we augment our basic rules for solving the puzzle with this scheme of associating letter labels with cells as follows:

Rule 4: Associate a letter of the alphabet as a label with the filling of a cell if the filling is based at least in part on one or more cells associated with the letter immediately preceding the letter in the alphabet, but the filing is not based on any cell associated with a later that does not precede the chosen letter.

The filling of the grid of KenKen puzzle of FIG. 10 in the order discussed above is shown in FIG. 11. Here we first reasoned that (3,2) is a 1 or a 2, and (3,3) is a 1 or a 2. Neither of these two cells can be filled by this reasoning, directly depending only on the given numbers and Rules 1 and 2; another piece of information (for example, that (3,2) cannot be filled with 2) must be used to determine the numbers that can be filled into (3,2) and (3,3). Therefore, neither of these two cells may be labeled A by Rule 3. However, since (3,2) cannot be filled with 1 since it will contradict Rule 2 and number 1 in cell (2,2). Therefore, by a "one-step" logical reasoning we come to fill cell (3,2) with 2; and therefore, by Rule 3, associate the filling of cell (3,2) with the next label, B.

Thereafter, next cell (3,3) is filled with 1, and associated with the label C with the filling of cell.

Figure 22:
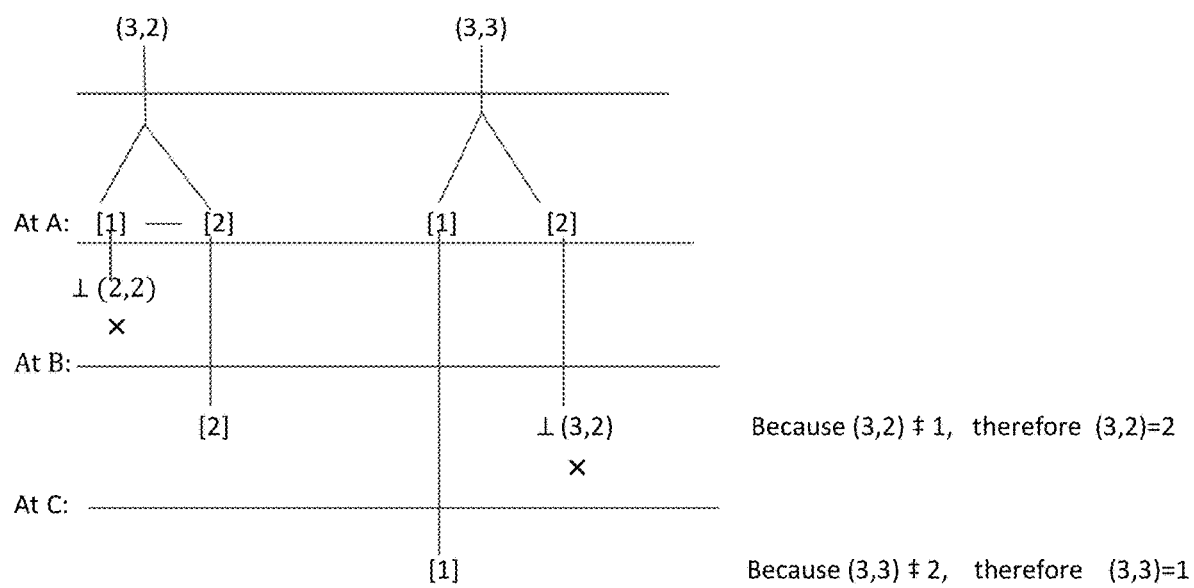
FIG. 22 is a diagram of the logic for associating labels with the partial filling of the cells during the solution of FIG. 11.

The filling and labeling of the cells (3,2) and (3,3) is diagrammed in FIG. 22, By similar reasoning, the filling of the cell (3,1) is associated with D, filling of (2,1) with E, and those of (1,2) with C, (1,3) with D, and (2,3) with E, respectively.

Next, we consider the solution to the same problem where the cells are filled in a slightly different order, displayed in FIG. 12.

Solution of FIG. 12

For the order of tilling the cells depicted in FIG. 12, we start by observing that since we are given that (1,1)=1 and (2,2)=1, by Rule 1, the number 1 cannot be filled in another cell in either the first or the second row, and by Rule 2, 1 cannot go into another cell in the first or the second column. Therefore, by Rules 1, 2 and 3, the number 1 can only be filled into a cell in the third row and the third column, i.e., (3,3). Since this filling is ascertained directly by applying rules 1, 2 and 3 and the numbers given (in the 1-cell cages), we associate A with (3,3)=1.

Figure 23:
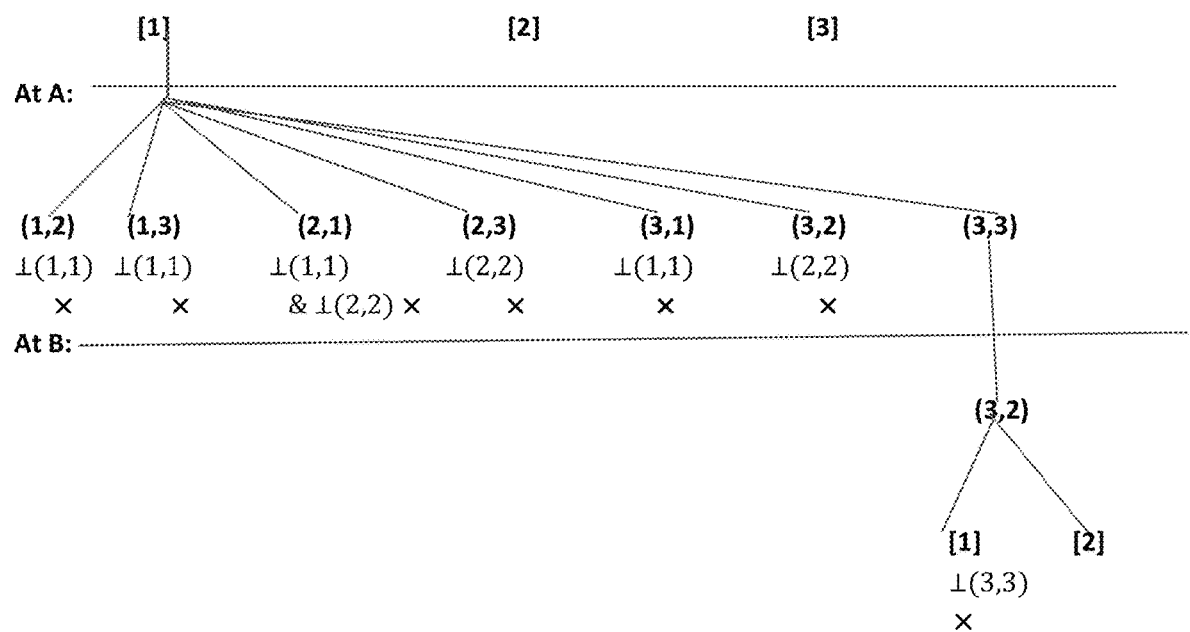
FIG. 23 is a diagram of the logic for associating labels with the partial filling of the cells during the solution of FIG. 12.

But, since (3,2)+(3,3)=3, it follows that (3,2)=2, therefore, the letter B will be associated with filling of the cell (3,2). The diagram of FIG. 23 shows the logic of this labeling.

Thereafter, (3,1)=3, associated with C. This, in turn, implies that (2,1)=5−3=2, and it will be associated with the next letter, i.e., D, since this filling is ascertained by using at least one cell associated with C.

Then, (1,2)=3 because the other two cells in the second column, i.e., (2,2) and (3,2) are 1 and 2 respectively, and it will be associated with C, leading to (1,3)=2 at D; finally (2,3)=3 at E. This is the solution shown in FIG. 12.

FIG. 13 shows yet another solution, i.e., another sequential order of filling the cells.

This example demonstrates the following important fact as we compare the "solutions" of a puzzle or activity obtained by executing the steps in different sequences: When labels, such as the letters of the alphabet or integers, are used in this context they are the devices and constructs which encapsulate the logical progression of the solution, and are used not in their ordinary linguistic role despite their familiarity.

Comparing the Solutions of FIGS. 11, 12 and 13

In order to compare the solutions of FIGS. 11, 12 and 13, we may use the following, reasonable postulate:

Postulate: The shorter the sequence of labels A, B, C, . . . , employed for a solution of a puzzle, the more "efficient" the solution of the puzzle will be.

With this postulate, one may regard the solution order of FIG. 12 to be slightly more efficient than the solution order of FIG. 11, since FIG. 11 has 1 B, 2 C's, 2 D's and 2 E's, whereas the solution order of FIG. 12 has 1 A, 1 B, 2 C's, 2 D's and 1 E.

Also, for easy comparison, we may associate numerical values with the letter labels: 1 to each A, 2 to each B, 3 to each C, and so on.

By allocating numerical values to the labels, it becomes possible to obtain one number to capture the logic of the solution obtained in a particular order, for example, by: Using the number of cells/spaces filled by this process towards a solution of the puzzle, as well as providing numerical values, 1, 2, 3, . . . , for the labels A, B, C, etc. and the frequency of the appearance of these labels as weights, we may compute a weighted "average" value associated with a solution, or a segment thereof. This weighted average is a normalized value that could be interpreted as the value associated with filling a "typical" empty cell of the puzzle in the solution process. A higher value of this average would indicate a more protracted solution, and a lower value a more efficient one.

For FIG. 11, this weighted average=(2*1+2*3+2*4+2*5)/7=3.7142, rounded to 4 decimal places.

For FIG. 12, the weighted average=(1*1+2*1+2*3+2*4+1*5)/7=3.1428.

We may conclude, therefore, that FIG. 12 displays a more "efficient" solution.

A third solution of the same problem is shown in FIG. 13, where we get 1 B, 1 C, 2 D's and 3 E's; the average value for this solution is a less efficient 4.0 than either of the other solutions.

Quantifying and Comparing the Logical Order of Performing Steps of an Activity

This example demonstrates that: (1) the order of filling the cells of a puzzle grid matters, even when the solution, when completed, is unique; and (2) it is possible to quantify the filling of the cells in a logical manner, and to capture the logical difference between two different sequences of filling the cells in a practical, meaningful manner that does not depend on time taken to solve a puzzle as the measuring parameter.

Furthermore, the allocation of numerical values to the labels makes it possible to provide numerical values for segments of solutions of puzzles in the target class. The comparison between solutions or segments of solutions, in this way, becomes as easy as comparing real numbers.

The approach and constructs of this example can be extended to a wide class of activities, games and puzzles. The possibility of comparisons based on the method and constructs exemplified by this KenKen puzzle turn out to be invaluable in the further creation of novel competitive games and activities based on known and implemented activities.

An extension of the method and the constructs to activities other than puzzles, however, requires the description and definitions given in the next several paragraphs.

In the description below, the method is extended to activities which may be performed step by step, but which go beyond Sudoku, KenKen, crossword etc. For these activities "filling of a character" into a space or a cell of a grid may not be directly meaningful but a "linking of a character" to a step may have a meaning that is similar in other respects to the filling of a cell in Sudoku etc.

The method disclosed herein is applicable to such an activity that comprises performing a sequence of steps from an initial state defined as a start of the activity to a final state defined as an end of the activity, subject to a set of instructions to determine which step or steps may follow a step of the activity during the performance of the activity, wherein a step of the activity is associated with a computed, measurable quantity.

By using a preset algorithm, furthermore, a measurable quantity may be computed and associated with one or more sequences of steps of the activity. Thus, we may associate a measurable quantity with the completed activity or a segment thereof. The purpose of associating such measurable quantities with the steps of the activity, wherever possible, is to compare two or more, different orders of performing the steps of the activity and to select a preferable sequence or order. Such a measurable quantity may be termed a "Measure of Efficiency" of performing the associated sequence of steps.

In some embodiments, the method described herein comprises the following acts: (1) providing an algorithm or mechanism to track a sequence in which the steps of the activity are carried out, typically towards the goal of completing the activity; (2) associating with each step of the activity a quantity, for example a real number, which takes into account the point in the sequence at which the step is carried out; (3) combining the quantities associated with the steps of the sequence into one measure; (4) comparing two or more sequences of steps based on their respective measures obtained in the combining step; and (5) ranking the two or more sequences by the order induced by the comparison of their respective numerical measures.

It should be appreciated that the activity may be any suitable activity that may be performed in steps following two or more distinct sequences. A quantity associated with a step of an activity may be a suitable numerical value, admissible in computational formula for computing the single measure for a sequence. Furthermore, the quantities associated with all the steps in the sequence in which the steps of the activity are carried out may be combined in a suitable, practical manner.

In some embodiments, a result of the ranking of the sequences may be presented on a suitable tangible medium. The tangible medium may comprise, for example, a printed publication, a game board, a computing device, a television set, a tablet, a mobile device (e.g., a mobile phone, a smart phone, a PDA), and any other suitable medium. The result of the ranking may be communicated, via a computerized network, the Internet, or in any other way, to a suitable device or other means, that may then present the ranking.

An important sub-class of activities of interest includes an activity which, given a set of spaces at least one of which is empty and a set of distinct characters, comprises linking a character from the set of distinct characters to each empty space in the set of distinct spaces by a given set of rules for linking a character to a space.

The sequence of steps of such an activity do not necessarily involve a continuum, such as, a row or a column of a grid. The "sequential continuity" between the spaces as they are linked to characters is maintained via logical relations between the spaces as they get linked to characters.

Thus, for such an activity we may specify that:
one or more of spaces in the set of spaces may have a character or characters linked at the start of the activity;
each of a set of specified spaces in the set of spaces has a character linked to it at end of the activity;
an Empty Space is a space in that does not have a character linked to it, and a space is not empty when a character gets linked to it;
the set of spaces comprises at least one Empty Space at the start of the activity;
a Step of the activity comprises linking a character from said set of characters to an empty space not inconsistent with any rule in said set of rules and not inconsistent with any linking of characters with spaces given at the start of the activity;
a Causally Connected pair of steps is a pair of steps where a Consequent step follows a Causal step by execution of said set of rules;
a Connected Chain of steps is a sequence of causally connected pairs of steps, wherein the first step is a causal step, each succeeding step except the last step in the chain is a consequent step and a causal step, and the last step in the connected chain is a consequent step, and
a sequence of steps having at least one connected chain is a Path or a segment thereof; and,
a measurable quantity called, Measure of Efficiency of a path or a segment thereof, may be computed.
Such an activity may be concisely described, and measure of efficiency computed, by assuming that the set of distinct characters is {Char(1), Char(2), . . . , Char(I), . . . Char($\lambda$)}, collectively identified as {CHARS};

the set of spaces is {Space(1), Space(2), . . . , Space(I), . . . Space($\sigma$)}, collectively identified as {SPACES},
the set of rules is {Rule(1), Rule(2), . . . , Rule(I), . . . , Rule($\rho$)}, collectively identified as {RULES}.

A measure of efficiency of a path or a sequence of steps may be computed by assigning numerical values to labels associated with the linking of characters with spaces, where the linking of a character Char(J) with Space(K) for integers J and K, for $1 \leq J \leq \lambda$ and $1 \leq K \leq \sigma$, includes associating Label(I) with the linking, wherein Label(I) belongs to a sequence of labels,
{LABELS}={Label(1), Label(2), . . . , Label(I), . . . }, and wherein,
(a) Label (1) is associated with a character, Char(J), linked to a space, Space(K), if the linking is not inconsistent with the given linking of {CHARS} to { SPACES} at the start of the activity; and
(b) Label (I) is associated with a character Char(J), linked to a space Space(K), if the linking is not inconsistent with:
(i) a Rule in the set {RULES};
(ii) the given linking of {CHARS} to {SPACES} at the start of the said activity; or
(iii) association of the labels Label(1), Label(2), . . . , Label(I-1) with the linking of characters in {CHARS} to spaces other than Space(K).

For an activity fitting the above description and the manner of tracking the order of executing the steps by the device of labels, the computation of a measure of efficiency can be accomplished by providing: (1) an algorithm for assigning numerical values to the labels; and (2) a formula for combining the numerical values. The method is further described and exemplified below.

Applications of the Method

Several interesting embodiments are possible and within contemplation of the invention, including: Variations of a basic puzzle, Novel ways to aid the player, Use in education and data security, Artistic Expression in various modalities and live or televised competitions.

Variations of Basic Puzzle

One possible embodiment of the invention could allow multiple players to compete against each other. The path that each player takes in reaching the solution would be used by the method to generate an "efficiency" score, i.e., the measure of efficiency of the path to solution by each player. The player with the best score would win.

In a variation on this embodiment, a single player could calculate his or her score and compare it to the best possible score for a particular puzzle. This could give a player an insight into how to improve his or her solving strategy. It would also allow for multiple attempts at the same puzzle to try and achieve a better efficiency score.

Activities Involving Chance

As indicated above, the methods of this disclosure may be used for certain classes of games and activities in addition to an element of chance. By the device of using labels, such as, A, B, C, . . . etc. with numerical values assigned to them, it is possible to compute the efficiency scores for sequences of steps and for segments of the paths to "solution." Thus, the use of labeling makes it possible to speak, for instance, of the row, column or box of a Sudoku puzzle with the best efficiency score, which we may call the first row, column or box to be filled.

This may allow live or remote audience of a Sudoku puzzle competition to place their bets on the first row, column or box to be filled. There are other possibilities for audience participation, for example, by placing their bets on: The winning player or players; the shortest solution; the best estimate for difficulty level; the number of cells which would be labeled with A, B, C, etc. Many other variations of this use can be created similar to these examples by using the method of labeling the paths to solution or their segments, or specific sequences of steps.

Novel Ways to Aid the Player

One application of the present invention is a method of providing hints for solving a Sudoku puzzle or a similar problem. For many such problems, the hints tend to be one-off's, dependent on the real-time state of the puzzle board in process. Therefore, they are limited at best, typically not available for such groups of problems unless the problems are presented in an electronic medium.

Thus, for example, if one tries to solve a puzzle online on the Internet and requests a hint at a particular stage of a Sudoku problem, some of the other, currently available systems may present a form of hint by marking the next cell where the player may fill in a character based on the cells which the player has already filled in. But, this method of dynamically providing hints at the run time is ad hoc at best, and is not available a priori, for example if the puzzle is printed, say in a book or in a newspaper, where the only hint may be the full solution, if available.

On the other hand, embodiments of the present invention can be used to generate a priori hints for each puzzle which can then be used by a player who needs the hints to solve the puzzle, but wants the pleasure of solving the puzzle without consulting the entire solution. These hints can be published in static media, such as books and newspapers. Systematic dynamic hints in various forms may be made available for electronic or real-time solution activity as well.

The claimed method here may be used to develop a system for providing a player with a range of hints for solving the puzzle. Thus, if a player attempting a solution gets stuck, unable to figure out the path forward, he or she does not need to look at the full solution to fill the sticky cell, or give up in desperation.

The present invention would allow for a subtle way to provide assistance. If a player gets stuck, the method could be used, for instance, to display all of the spaces which are one step away from the spaces that have been filled in. For example, at the beginning of a puzzle several of the spaces are already filled in. If a player requested a hint at that point, the method could highlight all the spaces which can be determined based only on the given numbers.

In a variation of this embodiment, the spaces of the puzzle could be marked from the outset, as hints, to show at what stage of the progress of the solution, the player might expect to fill each space. For example, by color differentiation: spaces that can be filled at a given stage could be marked red, while the spaces that can be filled at a different stage could be marked blue and so on. This embodiment could be useful for novice players to learn how to play, or for more experienced players attempting to become more proficient.

In another variation of this embodiment, the puzzle could be presented on one page or screen, the puzzle with the hints, if desired, on another page or screen, and finally the whole solution on yet another page or screen. For a player who is stuck at an interim point of the solution, it might be enough to look at the hints (e.g. color-coded hints) to focus attention to the way forward—this approach gives the player a path forward while maintaining the challenge, enjoyment or entertainment value of the puzzle activity.

In another variation, an indication of the difficulty level of a puzzle may be provided, which may be better than the usual "number of stars" currently employed by many newspaper columns, books and other publications to indicate difficulty level of a puzzle. Based on a relatively "efficient" solution such estimates of difficulty may be given in a bar chart, which may indicate not only how difficult the puzzle might be, but also at which point the going may be expected to get harder.

FIGS. 16, 17, 20 and 21 show the bar charts for the solutions 15 and 19 of the respective Sudoku puzzles. That the puzzle with 27 pre-filled numbers is more difficult than the puzzle with 24 given numbers is an interesting fact that emerges from the Measure of Efficiency calculation for the two puzzles.

Figure 14:
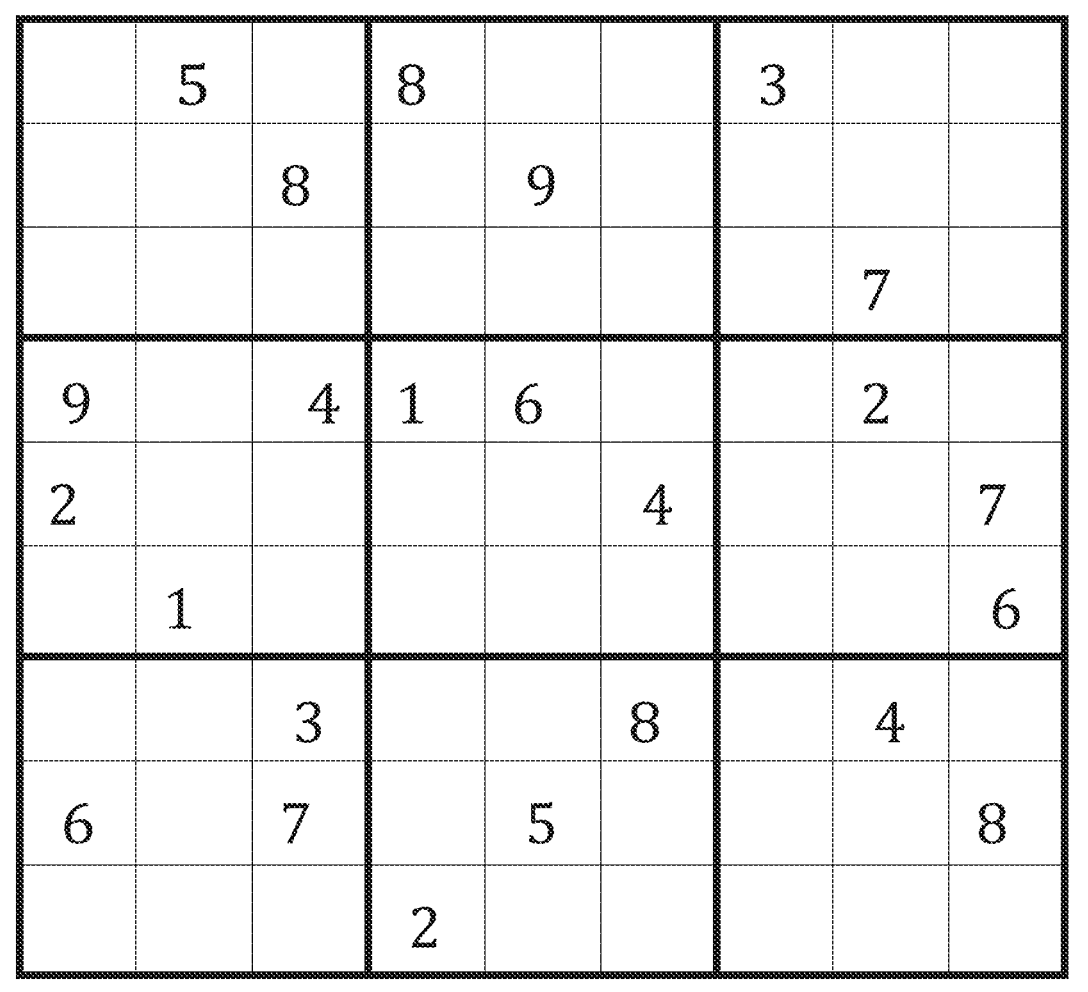
Figure 18:
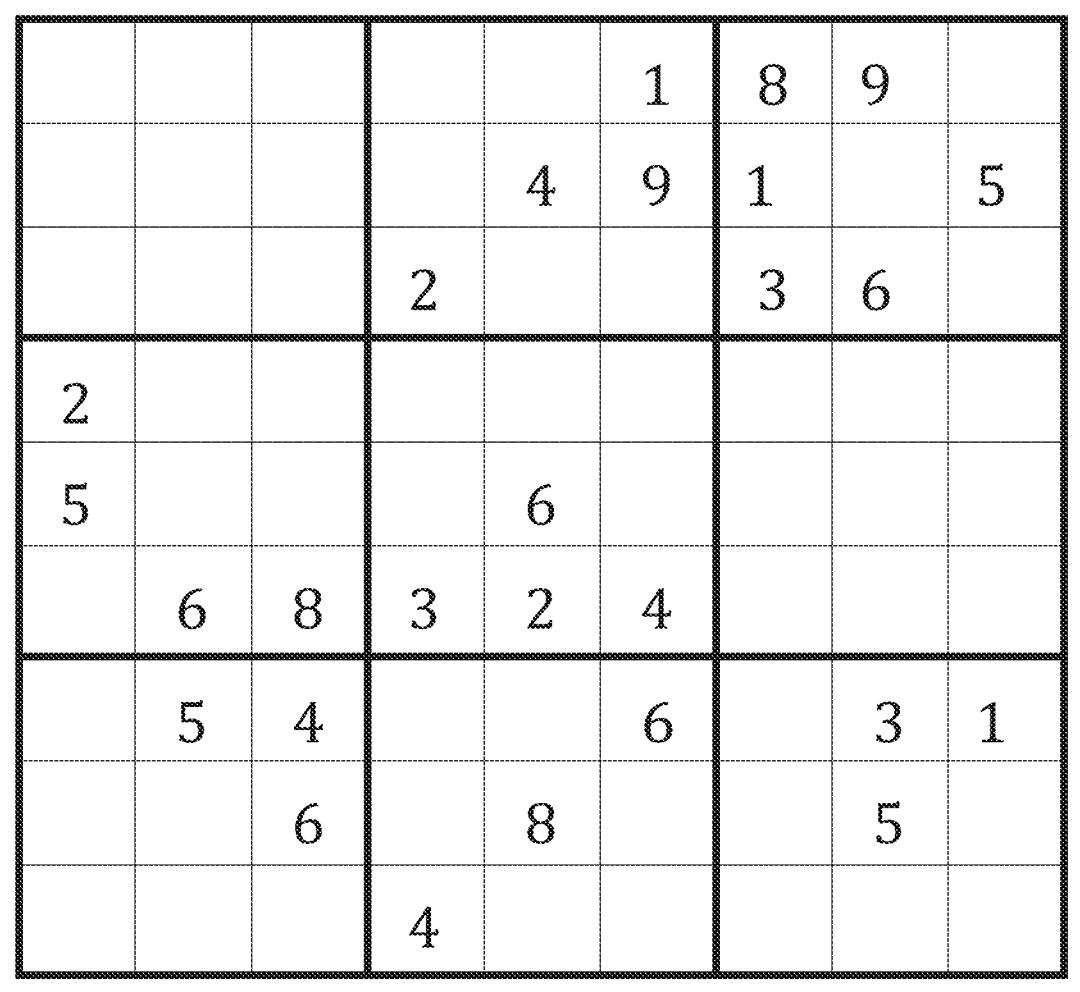

Furthermore, similarly comparing the respective Measures of Efficiency gives a quantitative estimate of how much more difficult the problem of FIG. 18 is than the problem of FIG. 14.

Non-Visual Ways to Aid the Player

The highlighted spaces in the potential embodiments need not be limited to color-coding or even visual hints. In an appropriate medium, one could use as hints auditory sounds, animation, or video. This would allow for hints that still do not reveal too much of the solution to detract from the pleasure of working out the puzzle. For example, if a player was stuck at a particular point, he or she could select an empty (blank) space. The claimed method would determine at which step the space could be filled, and then play a sound distinctively associated with that step level, distinguishing each number by a distinct sound, somewhat akin to the telephone set's sound or pitch associated with the dialing of numbers.

Additionally, similar to the color coding of visual hints, the auditory sound hints can be determined a priori and communicated to a player when he clicks on a particular cell at any point in the process of solving the puzzle, including the start.

Use in Education

The present invention uses an intuitive and engaging manner of communicating the logical connections between steps of solving a puzzle or game, with rule discernment and reinforcement built into the game. Therefore, the paths to solution as demonstrated by the methods of this invention can be valuable in the study, teaching and communication of logical analysis and argument.

Use in Data Security

Using a puzzle as the basis of security key, the methods of this invention can provide an additional dimension of randomization represented by the sequence in which the steps to solution are carried out.

Auditory Retraining and Uses in Psychological or Therapeutic Setting

A kind of auditory coding of the game board based on auditory hints mentioned above can find utility for training of auditory discrimination, testing or rehabilitation.

Artistic Expression

The claimed method can also be utilized to provide creative insights into the structure of an individual puzzle itself. When the claimed method divides the spaces to be filled at different stages in the process, it can discriminate between them by layers, grouped relative to the points at which those different spaces may be filled in. Alternatively, it may be possible to group certain spaces into a sequence or "path," connected by their logical connections which allow the player to fill in the spaces, related in a chain or tree structure.

Such a structure created through the claimed method has many potential uses. A visual depiction of the structure could allow for simple side-by-side comparison of two separate puzzles, or be combined to create an overlay. More creatively, a person could use the visual representation of the structure as the basis for a painting or other work of art.

A unique expression may be created by using the labels for a puzzle. The labels add another dimension to the numbers filling with numbers the cells of the grid of a puzzle like Sudoku. That extra dimension may be used to create interesting 3-D models of the solutions. Thus, for example, colors may distinguish the labels and the heights of columns may distinguish the numbers placed in the grid for a 3-D model of a solution. Or, the colors may distinguish the numbers in the grid and the column heights may correlate with the labels (with the higher columns representing the "higher" labels).

Practitioners in the field would appreciate that other variations of this manner of creating models are realizable.

The visual representation of a suitable puzzle could also be used as the basis of a choreographed dance performance, creatively coordinating its steps to the paths or stages of an individual puzzle.

Another creative application for the structure of a puzzle is as a basis for music.

Music, though created through artistic expression, has a great deal of structure. For example, the key a piece is written in, its time signature, or the various chords in a song.

The structure of a puzzle could be used as yet another basis for structure, which could produce or compose musical pieces unique to each individual puzzle. The piece for a typical Sudoku puzzle would depend on creative interpretation of the dimensions corresponding to the numbers, labels and relative positioning of the cells filled with both, for example.

Many or all of these possible uses of the described techniques may be combined into a television program which features all the aspects described above. Competitors could be challenged to complete puzzles, and their solutions would be judged for efficiency. During, between or at the end of these competition rounds, composers and dancers could be challenged to create unique songs and dances based on the individual puzzle. Judges could rate the participants on criteria, such as, the relative efficiency of the solutions, in addition to or on how closely they followed the structure of the puzzle, as well as on its aesthetic values.

As discussed above, the described techniques may be employed in multiple applications. An example of using the techniques for a game of Sudoku is described below. The process for other puzzles, games or activities may be described in an analogous manner by appropriately defining the start and finish, and by providing instructions for proceeding from one step of the activity to the next step (or any of the next steps) and by defining the stages, or similarity of stages, of carrying out the activity suitably.

Tracking the Progress of a Solution or Completion of an Activity

For the case of typical Sudoku, the method may proceed, for example, as follows: (1) maintaining record of the order in which the cells are filled by digits 1-9, by associating the stage at which each cell is filled with the letters A, B, C etc. to represent the stages and the order of filling the empty cells; (2) assigning numerical values to each of the letters A, B, C etc. (3) finding a weighted average for the solution, as executed in the exact order of filling the cells, which is the measure of the specific path taken to solution from the numbers of cells that carry each of the labels A, B, C etc. and their assigned numerical values; (4) comparing two or more solutions (paths) by their respective measures, and (5) ranking the solutions in order according to their respective measures.

Such a scheme can provide discrimination between two solutions of Sudoku that may be quite similar looking, but differ in preference or desirability by tying their order to the order between real numbers.

In another straightforward application, a scheme based on the method of the present invention may also provide a more precise measure of the difficulty level of a problem, unlike rating the ease or difficulty level by the number of "stars" or similar icons currently in vogue. For example, if the expert Sudoku players can come up with a best solution with a measure of efficiency of 6.9 (assuming that the difficulty level rises as the measure of efficiency increases) then it might be safe to estimate the difficulty level as 7, by estimating a ceiling for the measure.

Detailed Explanation of the Method

The explanation of the method is continued in greater detail below for the specific example of Sudoku, but it has wider applicability.

If a cell can only be filled with the digit 1, in a given puzzle for instance, because the placement of any other digit will be inconsistent with at least one rule or at least one other cell filled in given at the start, then it is linked with the A. Similarly, if a cell can only be filled with the digit 3 because placing any other digit in the cell will conflict with a rule or another cell that is linked with the character A, then this cell is filled with 3 and linked with the label B. And so on.

However, for a cell for which the linking of a character is not immediately determinable it is useful to go through a Listing Step, where a List of all possible numbers for the cell can be made by deleting from consideration the numbers which conflict with a rule or with another cell already filled and linked with a character from the set A, B, C, . . . . Attempts can be made to place the numbers in the List one by one, similarly to the usual trial-and-error approach.

Since only one number can be correctly placed in a cell by assumption, eventually all the numbers in the List, except one, will lead to a contradiction. Therefore, all numbers except one from the List can be eliminated, and one remaining number placed in the cell. The determination of the label for that filling of the cell is not obvious.

In such a case, one way to determine the label with the character to link with this cell can be algorithmically obtained as explained in the following example: If the List is drawn for an empty cell being filled when the only other cells "in the play" for the determination of the character for the target empty cell are associated with labels B or A (in addition to the filled ones given at the start), then pick a number from the List and tentatively link it to the cell with associated label C and proceed to fill other cells. If the contradiction thereupon occurs at the stage of label E, for example, make a record of this fact, then attempt to place the next number in the List. Suppose the next number on the List also ends in a contradiction, at the stage of linking the character associated with label F, again make a record of this fact. Proceed similarly with all numbers in the List. Suppose L ends up being the "highest" label (that is, with the highest ordinal in the sequence of labels) for numbers in the List for which there is contradiction. Then link M with this cell.

For record keeping and organizing this algorithm, it is useful to introduce a different set of characters that can be mapped to the set of labels A, B, C etc., and associate them with the List. One such set of characters can be the lower case Roman letters, a, b, c, etc., which may be used as follows: if, when the List of possible numbers for a particular cell is drawn, no other cell with the label higher than A is in the play, associate the character "a" with the List; if no other cell with the label higher than B is of concern then associate the character "b" with the List; and so on; and, if the List is drawn on the basis of the pre-filled cells only then do not associate any lower case character with the List.

Since the lower case letters a, b, c, etc. have a natural mapping to upper case letters A, B, C, . . . , they are useful as a secondary set associated with the Lists of possible numbers for the empty cells. In this scheme, the lower case letters can capture the state (the "snapshot") of the puzzle's solution-in-progress at the end of associating as labels the corresponding upper case letters A, B, C, etc. with the cells. The associating of the letters A, B, C etc. in this scheme can be thought of being done at the beginning of the relevant stage (A or B or C etc.) of filling in the cells.

The FIGS. 2, 4, 7-9, 11-13, 15 and 19 provide examples of these algorithms, and FIG. 4 of using the List of characters; they show the labels A, B, C etc. next to the number placed in a cell to the right of the number, and where applicable, the characters a, b, c, etc. along with the corresponding List, shown elsewhere within the cell.

Figure 1:
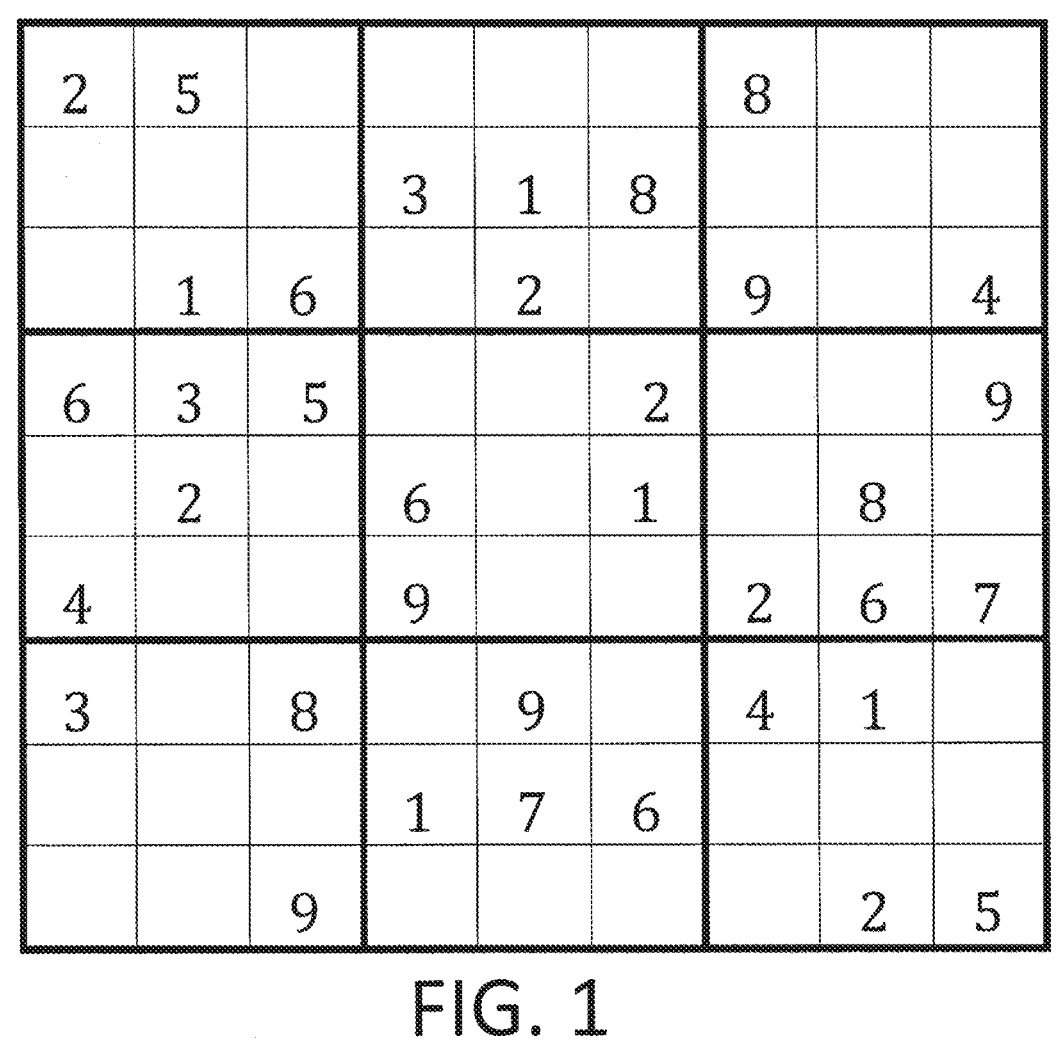

The explanations below relate to these FIGs. as concrete examples. FIGS. 1 and 3 are the Sudoku puzzles appearing in The Big Book of Sudoku, published by Parragon in the 2009 edition, as No. 3 and No. 289, respectively. FIGS. 2 and 4 respectively, present solutions for the puzzles shown in FIGS. 1 and 3.

The puzzle of FIG. 1 shows 36 cells filled already at the start, leaving 45 empty cells for a player to fill. By the rules of Sudoku the 45 empty cells must be filled with one, and only one, number from 1 to 9 in such a way that no cell can be left blank at the end, and no number may occupy more than one cell in a row or a column or in a 3×3 block, delineated by the solid lines, within which the empty cell being filled lies.

A solution of the puzzle is shown in FIG. 2 displaying the labels according to the algorithm of the disclosure herein. For this easy problem the displayed solution needed to use the labels A, B and C only. For example, the cell in row 1, column 6, i.e., cell no. (1,6), is shown filled with number 9 with label A, since all other numbers 1 to 8 will conflict with at least one other already filled cell, or conflict with a rule. Here, cell no. (1,6) could be tentatively be filled with other numbers; but placing 9 in another empty cell in the box will be inconsistent with the rule that a number cannot be repeated in a row or a column; this is because all other empty cells in the 3×3 block have a 9 in the corresponding row or column—therefore number 9 cannot be placed in any other empty cell in the block.

The number 4 in cell (4,8) carries the label A for a slightly different reason: all numbers other than 4 will conflict with a cells filled at the start. Thus, 1 in (4,8) conflicts with 1 in (7,8), repetition in the same column; 2 conflicts with (6,6), repetition in the same box and with (4,6), repetition in the same row; 3 conflicts with (4,2), repetition in the same row; 5 with (4,3), repetition in the same row; 6 with (6,8), repetition in the same box and in the same column, and with (4.1) repetition in the same row; 7 with (6,9), repetition in the same box; 8 with (5,8), repetition in the same box; and 9 with (4,9), repetition in the same box and the same row.

The number 8 in (4,5) carries the label B since the numbers 1-7 and 9 conflict with the cells (5,6), (2,5) and (4,7) for 1; (4,6), (3.5) for 2; (4,2) for 3; (4,8) for 4; (4,3) for 5; (5,4) and (4,1) for 6; (8, 5) and (4,4) for 7; and, (6,4) and (4,9) for 9. Some of these cells are associated with label A. and all other conflicts are with a pre-filled cells or cells carrying no higher label. In particular, for example, the number 4 conflicts only with the cell no. (4,8), labeled with A and is excluded on this account. Similarly, the other numbers are excluded because of one or more cells labeled A, hence the 8 in (4,5) is labeled B.

The cell (6,6) is filled with the number 3 and is labeled C because the cells (5,5) for 4 and (7,6) for 5, both with label B will conflict with (6,6), and also, no cell with label A or lower can eliminate the numbers 4 and 5 from consideration.

It is worth noting that if a certain label can be associated with the filling of a cell, then in general, a higher label can be associated with the same cell, although it might not be optimal. It is desirable in this scheme, in order to demonstrate conflict, to pick conflicting cells with "lowest" possible label to link with a cell, where "lower" means one that precedes in the list of labels, such as the alphabet used here.

Additionally, in this scheme if the Objective is to find the most efficient solution, the numbers may be associated with the labels in an increasing order for the purpose of computing weighted average, and the efficiency of the sequence defined so that the lower the weighted average the more efficient the solution.

It is possible in such a scheme also to introduce other selection criteria for the conflicting cells. For example, it may be stipulated that a cell in the same box as the cell being filled will be picked over a cell in the same row or column if the conflicting cells carry the same label.

Further Examples of Computation of Measure of Efficiency

The puzzle of FIG. 1 has 45 empty cells. The labels for the solution in FIG. 2 are: 16 A's, 18 B's and 11 C's. For quantification of the solution, using the numerical value 1 for A, 2 for B and 3 for C, the weighted average for this solution sequence is (16+36+33)/45=1.888 . . . , which may be used as the "measure of efficiency" for this solution. Since this is a low number, the corresponding solution (sequence of filling the cells) may be regarded as "efficient."

It takes more cogitation to optimize the measure of efficiency. Whereas the label A has been used for one of the conflicting cells in this solution, the label B might be used by a less careful player if he fails to recognize the option of choosing the sequence or the rule-based argument assuring a lower label. Consequently, the measure of efficiency (weighted average) for the less careful player will be higher. For instance, if while filling the cell (6,6) of the puzzle of FIG. 1, the player overlooks that 5 in cell (6,6) will conflict with a 5 in cell (7,6) and the label B, and determines that conflict will be with the 5 in cell (6,5) that carries the label C, then he may place the label D in cell (6,6), thereby increasing the weighted average.

This error by the less careful player may be viewed as arriving at the placement of the number 5 in the cell through a different sequence of steps and, unsurprisingly, a different weighted average and a different level of efficiency of the solution.

The method can be used for the puzzle in FIG. 3, with a much longer sequence of steps. The number of empty cells at the start is 49. The solution given in FIG. 4 has the following distribution of labels: 6 A's, 6 B's, 4 C's, 1 D, 1 E, 2 F's, 7 G's, 7 H's, 9 I's and 5 J's, which shows that the correct number determination for several cells is much slower, reflected in an approximate weighted average of 5.8163.

Compared to the puzzle of FIG. 1, this puzzle is more difficult, with 49 spaces to fill rather than 45. The measure of efficiency, however, gives a much more precise comparison of difficulty levels of the two puzzles, approximately 5.8 versus 1.8 for the puzzle of FIG. 1. Clearly the difference is the result not only of the 4 additional empty spaces in this puzzle, but also the distribution of, and the numbers in the pre-filled cells, and it is reflected in 10 labels, from A to J, as opposed to a 3 from A to C.

Computing Efficiency for Other Puzzle Types

For other puzzles, alternative instructions for maintaining the sequences of steps, formulas for allocating values for the steps or labels, and algorithms for computing the measurable quantities for efficiency may be employed. However, the goal with the alternatives still is to compute a measure of the efficiency of the solution based at least in part on the number and order of steps taken in a path towards the solution.

Figure 5:
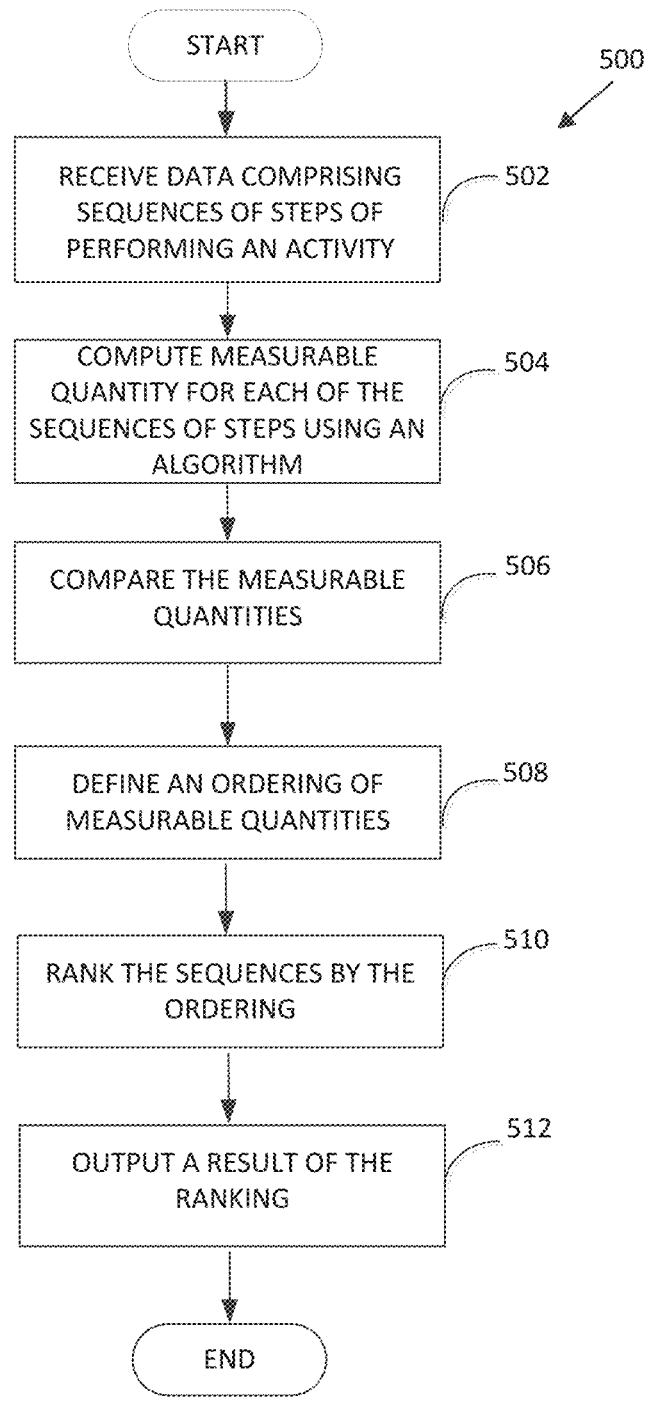
FIG. 5 is a flowchart of a method of ranking sequences of steps of a performance of an activity, in accordance with some embodiments.
Figure 6:
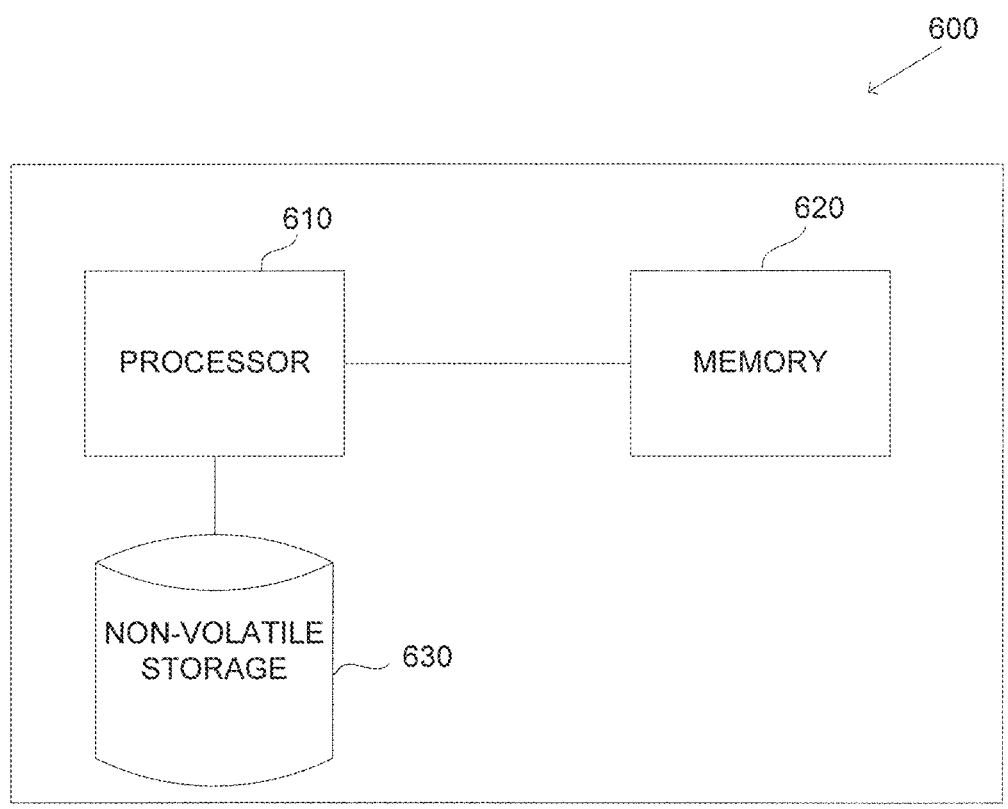
FIG. 6 is a diagram illustrating an exemplary computer system on which some embodiments of the invention may be employed.
Figure 7:
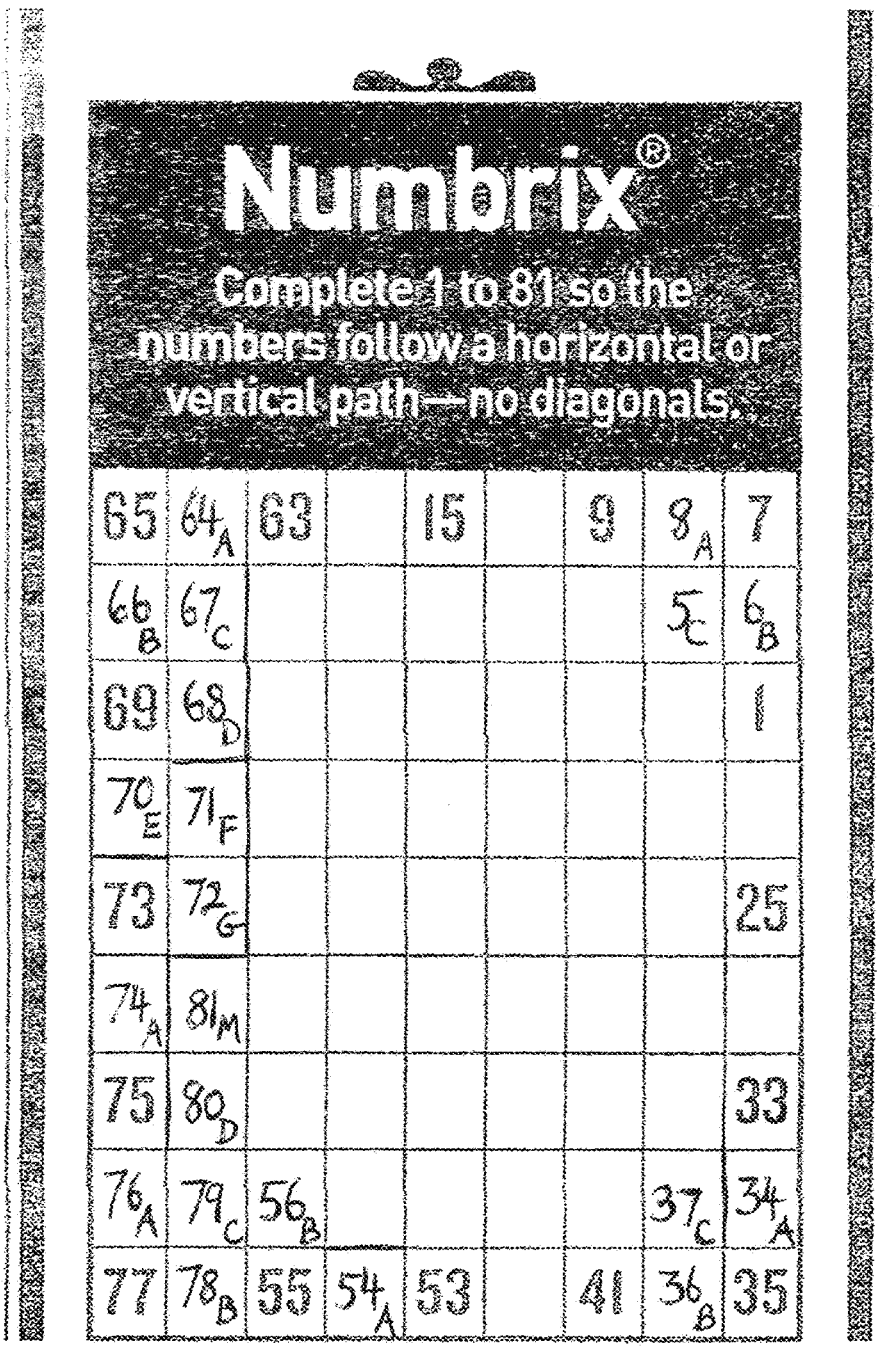
FIG. 7 is a variation of a method in accordance with some embodiments of the invention, wherein the method is applied to a crossword puzzle from Action Unlimited, a Massachusetts local advertiser publication.

A partial solution to a puzzle called "Numbrix" is shown in FIG. 7. The cells are filled numbers between 1 and 81 in numerical order but in a horizontal or vertical path. The FIG. 7 shows some of the cells with the labels A, B, C, etc., depending on stage at which the number was determined.

The cell in 6th row, 2nd column is filled with 81 but has the label M for the following reason: The 80-D in (7,2) position means that 81 can either go into (7,3) or (6,2). A trial of 81 in (7,3) however leads to an inconsistency, given that 56 is in (8,3) and 63 in (1,3). The two available paths between (8,3) and (1,3) would end in inconsistency at L starting from 57-E in (8,4). Therefore, 81 goes into cell (6,2) with the label M.

For this simple puzzle, there are not too many alternative paths, and it can be used for simple competitions.

Furthermore, such a scoring method for this and other simple puzzles can be useful in quantified psychological testing to benchmark or to measure the progress or regression of a player's mental faculties. Indeed, the methods of this disclosure for such simple puzzles provide the equivalent of a "mice in a maze" which has traditionally been the mainstay of psychological experiments.

For a crossword puzzle, another popular puzzle type, where the cells need to be filled with letters in order to satisfy the given clues, for example, it may be meaningful to employ as labels letters of another alphabet, e.g., $\alpha$, $\beta$, $\gamma$, . . . of the Greek alphabet, as well as the following set of instructions and formulas in order to discriminate between two paths to solution: (1) Start with a letter in a cell; (2) fill the cells in the box containing this cell to form the word or phrase according to the clue; (3) continue to fill the cells to form words or phrases according to the clues in the boxes where at least one cell has already been filled, but not the cells in boxes that do not have any letter filled in; (4) identify each of the cells filled in by the letter $\alpha$; (5) fill a cell in a new "empty" box that has no cell filled with a letter; (6) starting the next sequence with this cell, continue to fill the cells to form words or phrases according to the clues in the boxes where at least one cell has already been filled, but not the cells in boxes that do not have any letter filled in; (7) identify each of the cells filled in by the letter $\beta$; (8) continue to fill the cells in the crossword puzzle in analogous, recursively manner until all boxes and cells are tilled; (9) count the numbers of the cells that carry the identifiers $\alpha$, $\beta$, $\gamma$, . . . ; (10) allocate numerical values to each of the letters $\alpha$, $\beta$, $\gamma$ . . . ; (11) calculate the numerical measure of the solution by a formula based on the values allocated to the letters $\alpha$, $\beta$, $\gamma$, . . . .

Figure 8:
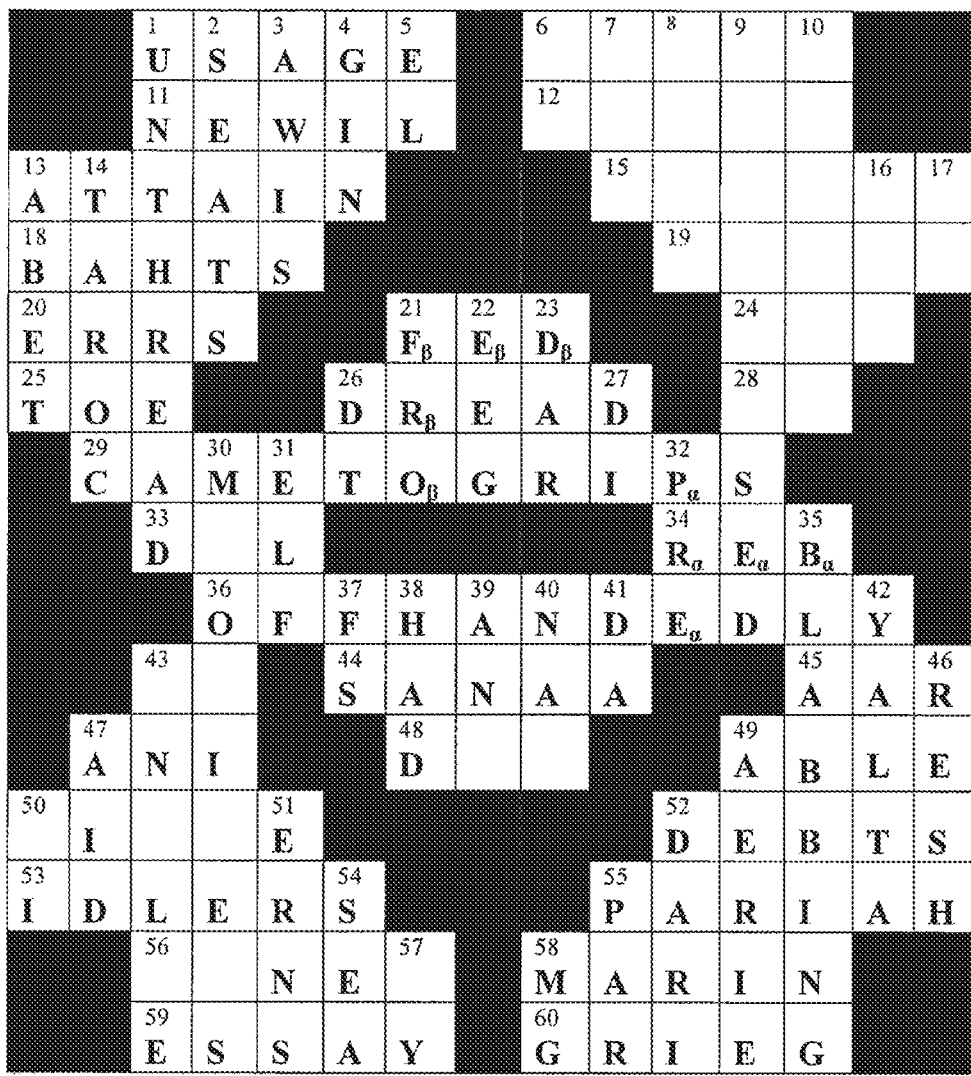
FIG. 8 is a variation of a method in accordance with some embodiments of the invention, wherein the method is applied to an example of the number puzzle "Numbrix" published in the Parade magazine.

FIG. 8 shows a partial solution to a crossword puzzle, along with a few of the cells identified with the labels $\alpha$ and $\beta$. This solution starts with R in first cell for clue box number 34 across, and fills E and B to complete the box, with all three of these cells identified with $\alpha$. Next, cells in the box for clue 3 are tilled and identified with the label $\alpha$, since the letter R is already filled in the box. The solution supposes that the puzzle solver hit an "impasse in the $\alpha$ chain," and had to restart with clue box 21 that did not have any letter in it either across or down, tilling them with the letters F, R, O, down and E, D, across, each of the corresponding cells therefore carry the identifier $\beta$.

The figure shows the partial solution where the process had to be started five times up to that point, at boxes numbered 34, 21, 31, 54 and 25. Although no other identifiers are shown for legibility, the label identifiers used are at least $\alpha$, $\beta$, $\gamma$, $\delta$, $\epsilon$.

Several reasonable options exist for computing the numerical measure of efficiency of the sequence of steps in this case, the simplest being a weighted sum, viz., adding for each identifier the product of the number of cells with the identifier and the value assigned to the label identifier. A normalized value of efficiency measure may also be computed as in the case of Sudoku.

Visual Depiction of Different Solutions to a Puzzle

By using different colors for different labels this difference may be visually presented for instant communication of the difference in complexity of the two puzzles.

It will be recognized that there are many alternatives for defining the sequence of steps in a crossword puzzle as well, such that the order of completion is germane to scoring. And, finally any of several mathematical alternatives may be used for scoring formulas.

By using different colors, or by other distinct representations for the different labels, this difference may be visually presented for instant communication of the difference in complexity of the two puzzles. The measure of efficiency may be used to compare not only the solutions for the same puzzle, but also to compare, to an approximate extent, the solutions and inherent difficulty levels of two different puzzles.

FIG. 9 visually depicts the partial structure of the solution of FIG. 2 where the letters A, B and C correspond to different graphic patterns. For legibility this depiction shows only the squiggly patterned graphic filling the cells with the label C, but other cells can similarly be filled with colors, patterns or animation graphics to form a collage that reveals the structure of the puzzle.

Hints for Solving a Puzzle

It is important to note that the structure of a puzzle is only partially captured by the number of empty cells. The structure of Sudoku puzzle depends to a great extent on the distribution of the numbers provided in the cells at the start and such graphic depiction of the puzzle can provide much more information about the structure of the puzzle Non-visual hints may be provided based on the methods disclosed herein. As stated above, the hints may be auditory sounds, animation, or video. The hints may also comprise other types of input, for example, olfactory input, or combination of different types of input.

The hints must be able to be organized in a sequence and able to be associated with the discreet steps of the activity. Such organization would allow for hints that still do not reveal too much of the solution to detract from the pleasure of working out the puzzle but help a player was stuck at a particular point in the activity.

Additionally, similar to the color coding of visual hints, the auditory sound or other types of hints can be determined a priori and communicated to a player either dynamically when he clicks on a particular cell at any point in the process of solving the puzzle, or at the start.

As discussed above for the case of typical Sudoku, the method may proceed, for example, as follows: (1) maintaining record of the order in which the cells are filled by digits 1-9, by linking the stage at which each cell is filled with the letters A, B, C etc. to represent the stages and the order of filling the empty cells; (2) assigning numerical values to each of the letters A, C etc. (3) finding a weighted average for the solution, as executed in the exact order of filling the cells, which is the measure of the specific path taken to solution from the numbers of cells that carry each of the labels A, B, C etc. and their assigned numerical values; (4) comparing two or more solutions (paths) by their respective measures, and (5) ranking the solutions in order according to their respective measures.

The labels A, B, C etc. used to obtain the rankings may further provide a segmentation of the puzzle board or activity. The segmentation can then be used to creatively express the solutions or the steps of the activity and combined into novel pieces of art, music and expressions in other media.

FURTHER NOTES ON IMPLEMENTATION OF THE METHOD

The above-described embodiments of the present invention can be implemented in any of numerous ways. For example, some aspects of the embodiments may be implemented using hardware, software or a combination thereof. When implemented in software, the software code can be executed on a suitable processor or collection of processors, whether provided in a single computer or distributed among multiple computers. It should be appreciated that any component or collection of components that perform the functions described above can be considered as one or more controllers that control the above-discussed functions. The one or more controllers can be implemented in numerous ways, such as with dedicated hardware, or with general-purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely to describe and distinguish one claim element having a certain name from another element having the same name or descriptor (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Finally, while much of the description has used the language appropriate to puzzles like Sudoku where cells or spaces are actually meant to be filled, much of the methodology, techniques and procedures may be extrapolated to other games and activities, if they can be modeled by logic puzzles.

Also described here is the functionality and requirements of the computerized machines and networks which enable the carrying out of various processes. These machines may form subsystems within larger engines or platforms to enable the multiple utilities outlined above. Aside from holding copies volumes of data, these machines carry out verification of solution steps and label associations and generating merged labels and hints, for example.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method of generating labels by a computerized system, including a computing device or a network of computing devices, to track an order of execution of steps for solving a puzzle that has a given configuration of a set of spaces, a given set of distinct characters, and a given set of rules, wherein,
   the set of spaces includes one or more empty spaces;
   a space is non-empty if it has a character filled in it;
   a step of solving the puzzle comprises filling an empty space of the one or more empty spaces with a character selected from the given set of distinct characters consistent with the given set of rules and the given one or more non-empty spaces in the set of spaces when the set of spaces includes one or more non-empty spaces;
   the puzzle is solved by one or more steps of filling the one or more empty spaces in the set of spaces;
   a solution to the puzzle is complete when all of the one or more empty spaces in the set of spaces are filled by steps of solving the puzzle;
   a path to the solution, or solution-path, is a chain of two or more steps of solving the puzzle which are linked in the same sequential order in which the corresponding two or more empty spaces of the one or more empty spaces are filled;
   a first step of a solution-path has no prior step, and at the first step of the solution-path, an empty space of the one or more empty spaces is filled with a character from the

29 given set of distinct characters based on the given set of rules and the given one or more non-empty spaces in the set of spaces;

a second or subsequent step of the solution-path comprises filling an empty space of the one or more empty spaces with a character from the given set of distinct characters based on the given rules, the given one or more non-empty spaces in the set of spaces and a character filled in an empty space of the one or more empty spaces during one or more prior steps of the solution-path;

and, the method of generating labels to track the order of execution of steps for solving the puzzle based on one or more solution-paths comprises the following actions:

(a) providing a sequence of labels, {Label(1), Label(2), . . . , Label(I), . . . } with a known sequential order;

(b) receiving a labeling algorithm for associating the labels with the filling of empty spaces in a solution-path, where Label(1) is associated with the first step of the solution-path and each empty space filled at a second or subsequent step of the solution-path is associated with a label based on the known sequential order of labels in the sequence of labels;

(c) receiving into the computerized system, a first step of a first solution-path;

(d) receiving into the computerized system, an association of Label(1) with the empty space filled at the first step of the first solution-path;

(e) recording the association of Label(1) with the empty space filled at said first step of the first solution-path;

(f) receiving into the computerized system a next step in the first solution-path when said next step exists;

(g) receiving an association by said labeling algorithm of a label with the empty space filled at said next step;

(h) recording into the computerized system, the label associated with the empty space filled at said next step;

(i) receiving into the computerized system a first step of a next solution-path when said next solution-path exists;

(j) receiving into the computerized system an association of Label(1) with the empty space filled at said first step of said next solution-path;

(k) receiving into the computerized system, a next step in said next solution-path when said next step exists;

(l) receiving an association by the labeling algorithm of a label with the empty space filled at said next step in said next solution-path;

(m) recording into the computerized system the label associated with the empty space filled at the next step in said next solution-path;

(n) determining by the computerized system if a label associated with filling a given empty space for any of said one or more solution-paths is inconsistent with a rule in the given set of rules, a given non-empty space in the set of spaces or an empty space filled at any prior step of the solution-path;

(o) selecting from said one or more solution-paths, a subset of solution-paths for which no label associated with the filling of an empty space is inconsistent with a rule in the given set of rules, a given non-empty space of the set of spaces or an empty space filled at a prior step of the solution-path;

30

(p) saving the labels associated with the filling of each empty space for the selected subset of solution-paths;

(q) receiving a combining algorithm to combine labels associated with filling an empty space for multiple solution-paths into a synthesized merged label for the empty space;

(r) combining, by said combining algorithm, the saved labels for each given empty space for the solutions-paths in the selected subset of solution-paths into a synthesized merged label for the empty space; and (s) associating with each empty space of a given puzzle, the synthesized merged label for the empty space.

2. The method of claim 1, wherein, associating a label with a second or subsequent step of filling an empty space for the solution-path comprises the following acts:

(b1) determining at the step of filling the empty space, a subset of characters in the given set of distinct characters not inconsistent with a rule in the given set of rules, a given non-empty space in the set of spaces or a space filled at one or more prior steps of the solution-path;

(b2) filling the empty space with each character in said subset, one at a time, as a trial to solve the puzzle;

(b3) for each trial to solve the puzzle that results in a failed trial in which a solution to the puzzle is not complete, counting a number of steps from the filling of the empty space with the character to a logical error for said failed trial;

(b4) finding an integer value based on the numbers of steps from the filling of the empty space to the step ending in the logical error for the failed trials;

(b5) identifying, based on the trials to solve the puzzle, a label from the sequence of labels that follows the step of filling the empty space by at least the said integer value;

(b6) associating the label identified based on the trials to solve the puzzle, or a successive label from the sequence of labels, with the step of filling the empty space with the character in the subset of characters that does not result in a failed trial.

3. The method of claim 2 for associating a label with said second or subsequent step when there are two possible characters to fill the empty space including a first character for which a logical error does not occur when the empty space is filled and a second character for which a logical error occurs when the empty space is filled, wherein identifying a label for filling the empty space further comprises:

(b5-1) designating as a causal-step the trial of filling the empty space with the second character;

(b5-2) holding as a tentative label for the filling of the causal-step a label that is not inconsistent with a given rule in the given set of rules, a given non-empty space in the set of spaces or a space filled at any prior step of the solution-path;

(b5-3) counting a number of steps following the causal-step along one or more chains of steps to a logical error in the solution-path;

(b5-4) finding a smallest number among the number of steps for the one or more chains to the logical error;

(b5-5) identifying a label in the sequence of labels that succeeds said tentative label by at least said smallest number; and (b5-6) associating the filling of the empty space with the label identified in (b5-5).

4. The method of claim 1, wherein said determining by a computer if a label associated with a given empty space is inconsistent with a rule in the given set of rules, a given non-empty space in the set of spaces or an empty space filled at any prior step of the solution-path comprises the following acts:
- (n1) filling the empty space with each character in said given set of distinct characters, one by one, as a trial to solve the puzzle;
- (n2) for each trial to solve the puzzle that results in a failed trial in which a solution to the puzzle is not complete, counting a number of steps from the filling of the empty space with the character to a logical error;
- (n3) saving, for each of the failed trials, a minimum number of steps to the logical error;
- (n4) verifying that the empty space is only filled with a character from said given set of distinct characters that does not end in logical error;
- (n5) verifying that the label associated with the step of filling the empty space follows in the sequence of labels, distant by more than said minimum numbers for all of the failed trials.

5. The method of claim 1, wherein,
- (q1) a sequence of numerical values is provided;
- (q2) each label in the sequence of labels is assigned a numerical value from the sequence of numerical values; and
- (q3) said combining algorithm is based on numerical values assigned to each of the labels associated with filling a given empty-space for multiple solution-paths, which are combined into one value to obtain the synthesized merged label for the empty space.

6. The method of claim 5, wherein, said combining algorithm computes a weighted average of the numerical values assigned to each of the labels associated with filling the empty space for the selected subset of solution-paths, wherein a set of weights used for the weighted average is pre-specified.

7. The method of claim 5, wherein,
said given set of distinct characters is $\{Char(1), Char(2), \ldots, Char(I), Char(\lambda)\}$, collectively identified as $\{CHARS\}$;
said set of spaces is $\{Space(1), Space(2), \ldots, Space(I), Space(\sigma)\}$, collectively identified as $\{SPACES\}$;
said given set of rules is $\{Rule(1), Rule(2), \ldots, Rule(I), Rule(\rho)\}$, collectively identified as $\{RULES\}$; and
filling of Space(K) with a character Char(J) for integers J and K, for $1 \leq J \leq \lambda$, and $1 \leq K \leq \sigma$ is associated with the sequence of labels so that: Label(1) is associated with filling Space(K) with a character, Char(J), if the filling is not inconsistent with $\{Rules\}$ or with any given non-empty space in $\{SPACES\}$;
Label(I) is associated with the filling of Space(K) by character Char(J), if the filling is not inconsistent with: a Rule in the set $\{RULES\}$, or a given non-empty space in $\{SPACES\}$, or the association of labels, Label(1), Label(2), $\ldots$, Label(I−1) with the filling of characters from $\{CHARS\}$ into spaces other than Space(K); and, Label(I) is assigned the numerical value I.

8. The method of claim 5, further comprising:
- (q1) providing receiving a formula for producing a synthesized value from a combination of numerical values given to a set of labels;
- (q2) computing by said formula, for each given empty space, the synthesized value from the labels associated with the step of filling the empty space for the selected subset of solution-paths;
- (q3) compiling a list of all synthesized values computed for the given empty spaces;
- (q4) sorting the compiled list of all synthesized values in increasing order;
- (q5) receiving a desired number of synthesized merged labels;
- (q6) segmenting the sorted compiled list of all synthesized values into a number of partitions based on the desired number of synthesized merged labels; and
- (q7) correlating the synthesized merged labels sequentially with the partitions in order, starting with correlating the first label with the first partition.

9. The method of claim 1, further comprising:
- (t) generating hints for a new player or a new solution-path using the synthesized merged labels.

10. The method of claim 1, comprising the following additional acts for comparing parts of solution-paths or solutions:
- (t) receiving all labels in one or more parts of one or more solution-paths or solutions;
- (u) receiving numerical values of all labels in each of said one or more parts;
- (v) computing the combined values of labels for each of said one or more parts; and
- (w) comparing the combined values of labels for said one or more parts for the one or more solution-paths or solutions.

11. The method of claim 1, comprising the following additional acts for comparing numerical values for segments of the given set of spaces:
- (t) providing one or more segments of the given set of spaces;
- (u) receiving all labels in the one or more segments for one or more solution-paths;
- (v) receiving numerical values of all labels in said one or more segments for said one or more solution-paths;
- (w) receiving an algorithm to compute a combined value of labels in said one or more segments;
- (x) computing combined values of labels for said one or more segments; and
- (y) comparing combined values of labels in said one or more segments.

12. The method of claim 1, wherein the labels are a sequence of distinguishable forms, including visual or auditory forms.

* * * * *

UNITED STATES PATENT AND TRADEMARK OFFICE
CERTIFICATE OF CORRECTION

PATENT NO.         : 10,933,323 B2
APPLICATION NO.    : 15/985723
DATED              : March 2, 2021
INVENTOR(S)        : Indu M. Anand et al.

It is certified that error appears in the above-identified patent and that said Letters Patent is hereby corrected as shown below:

In Claim 8, at Column 32, Line 5:
"(q1) providing receiving a formula for producing …"

Should read:
(q1) receiving a formula for producing …

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*